(12) United States Patent
Lee et al.

(10) Patent No.: US 8,009,768 B1
(45) Date of Patent: Aug. 30, 2011

(54) INTEGER FREQUENCY OFFSET ESTIMATION BASED ON THE MAXIMUM LIKELIHOOD PRINCIPAL IN OFDM SYSTEMS

(75) Inventors: Jungwon Lee, Cupertino, CA (US); Dimitrios-Alexandros Toumpakaris, San Mateo, CA (US); Hui-Ling Lou, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 856 days.

(21) Appl. No.: 11/836,768

(22) Filed: Aug. 9, 2007

Related U.S. Application Data

(63) Continuation of application No. 11/031,614, filed on Jan. 7, 2005, now Pat. No. 7,505,523.

(60) Provisional application No. 60/821,910, filed on Aug. 9, 2006, provisional application No. 60/822,599, filed on Aug. 16, 2006, provisional application No. 60/600,877, filed on Aug. 12, 2004.

(51) Int. Cl.
*H04L 27/06* (2006.01)

(52) U.S. Cl. ........ 375/340; 375/260; 375/344; 375/354; 375/371; 370/203; 370/204; 370/206; 370/208; 370/210; 370/480; 455/502; 455/516

(58) Field of Classification Search .................. 375/260, 375/340, 344, 354, 371; 370/203, 204, 206, 370/208, 210, 480; 455/502, 516
See application file for complete search history.

(56) References Cited

U.S. PATENT DOCUMENTS

| 6,930,989 B1 | 8/2005 | Jones, IV et al. |
| 7,215,636 B2 | 5/2007 | Seo et al. |

OTHER PUBLICATIONS

Chen Chen et al "Maximum Likelihood method for Integer Frequency Offset estimation of OFDM systems" Electronic Letters Jun. 2004.*

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 531 pages.

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology— Telecommunications and information exchange between systems—Local and metropolitan area networks— Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

(Continued)

*Primary Examiner* — David Payne
*Assistant Examiner* — Leon Flores

(57) ABSTRACT

An apparatus includes an estimator that includes a receiver that receives a plurality of frequency-domain symbols. Each symbol includes at least one of a plurality of pilot samples and a plurality of data samples. The estimator also includes a framer that observes the at least one of the plurality of pilot samples and the plurality of data samples in adjacent symbols, and a calculator that calculates an integer carrier frequency offset (CFO) estimate based on a reliability metric based on the at least one of the plurality of pilot samples and the plurality of data samples that are included in the frequency-domain symbols.

54 Claims, 21 Drawing Sheets

OTHER PUBLICATIONS

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

Jan-Jaap van de Beek et al; "ML Estimation of Time and Frequency Offset in OFDM Systems"; IEEE Transaction on Signal Processing, vol. 45, No. 7, Jul. 1997, pp. 1800-1805.

Ferdinand Classen; "Frequency Synchronization Algorithms for OFDM Systems suitable for Communication over Frequency Selective Fading Channels"; IEEE, Mar. 1994; pp. 1655-1659.

Jungwon Lee et al; "Effect of Carrier Frequency Offset on OFDM Systems for Multipath Fading Channels"; Global Telecommunications Conference, Nov. 29-Dec. 3, 2004; 5 pages.

Jungwon Lee et al; "A Blind Frequency Tracking Algorithm for OFDM Transmission over Frequency Selective Channels"; Vehicular Technology Conference, Sep. 26-29, 2004; 5 pages.

Paul H. Moose, "A Technique for Orthogonal Frequency Division Multiplexing Frequency Offset Correction"; IEEE Transactions on Communications, vol. 42, No. 10, Oct. 1994, pp. 2908-2914.

M. Morelli et al; "Frequency Ambiguity Resolution in OFDM Systems"; IEEE Communication Letters, vol. 4, No. 4, Apr. 2000; pp. 134-136.

Thierry Pollet et al; "BER Sensitivity of OFDM Systems to Carrier Frequency Offset and Wiener Phase Noise"; IEEE Transactions on Communications, vol. 43, No. 2/3/4, Feb./Mar./Apr. 1995; pp. 191-193.

T. M. Schmidl et al; Blind Synchronisation for OFDM; Electronics Letters, vol. 33, No. 2, Jan. 16, 1997; pp. 113-114.

Timothy M. Schmidl et al; "Robust Frequency and Timing Synchronization for OFDM"; IEEE Transactions on Communications, vol. 45, No. 12, Dec. 1997; pp. 1613-1621.

William Y. Zou et al; "COFDM: An Overview"; IEEE Transactions on Broadcasting, vol. 41, No. 1, Mar. 1995; 8 pages.

Schenk et al., "Frequency Synchronization for MIMO OFDM Wireless LAN Systems," FL Oct. 2003, *IEEE Conference Fall 2003*, Orlando, vol. 2, pp. 781-785, 5 pages.

Flores, Leon, Examiner, U.S. Patent and Trademark Office, in U.S. Appl. No. 11/031,614, in Office Action dated Jun. 25, 2008, to be published by the USPTO, 22 pages.

European Telecommunication Standard Institute, "Digital Radio Mondiale (DRM); System Specification (ETSI ES 201 980 V2.1.1)," Jun. 2004, European Telecommunication Standard Institute, 183 pages.

European Telecommunication Standard Institute, "Digital Video Broadcasting (DVB); Framing structure, channel coding and modulation for digital Terrestrial television (ETS 300 744)," Mar. 1997, European Telecommunication Standard Institute, 47 pages.

European Telecommunication Standard Institute, "Radio Broadcasting Systems; Digital Audio Broadcasting (DAB) to mobile, portable and fixed receivers (ETSI EN 300 401 V1.3.3)," May 2001, European Telecommunication Standard Institute, 222 pages.

European Telecommunication Standard Institute, "Digital Video Broadcasting (DVB); Transmission System for Handheld Terminals (DVB-H) (ETSI EN 302 034 V1.1.1)," Nov. 2004, European Telecommunication Standard Institute, 14 pages.

"TGn Sync Proposal Technical Specification", IEEE Std. 802.11n, 2005, 131 pages.

National Radio Systems Committee, "NRSC-5-B, In-band/on-channel Digital Radio Broadcasting Standard," Apr. 2008, National Radio Systems Committee, 47 pages.

* cited by examiner

INTEGER FREQUENCY OFFSET ESTIMATION BASED ON THE MAXIMUM LIKELIHOOD PRINCIPAL IN OFDM SYSTEMS

CROSS-REFERENCE TO RELATED APPLICATIONS

This application claims the benefit of U.S. Provisional Application No. 60/822,599, filed on Aug. 16, 2006, U.S. Provisional Application No. 60/821,910, filed Aug. 9, 2006, and is a continuation-in-part of U.S. patent application Ser. No. 11/031,614, filed Jan. 7, 2005, which claims the benefit of U.S. Provisional Application Ser. No. 60/600,877, filed on Aug. 12, 2004. The disclosures of the above applications are incorporated herein by reference in their entirety.

BACKGROUND

Wireless systems may use an Orthogonal Frequency Division Multiplexing (OFDM) transmission scheme. In an OFDM system, a data stream is split into multiple sub-streams, each of which is sent over a subcarrier frequency. Because data is carried over multiple carrier frequencies, OFDM systems are referred to as "multicarrier" systems as opposed to single carrier systems in which data is transmitted on one carrier frequency.

An advantage of OFDM systems over single carrier systems is their ability to efficiently transmit data over frequency selective channels by employing a fast Fourier transform (FFT) algorithm instead of the complex equalizers typically used by single carrier receivers. This feature enables OFDM receivers to use a relatively simple channel equalization method, which is essentially a one-tap multiplier for each tone.

Despite these advantages, OFDM systems may be more sensitive to carrier frequency offset, which is the difference between the carrier frequency of the received signal and the local oscillator's frequency. The carrier frequency offset may be caused by Doppler shift and oscillator instabilities, and can be many times larger than the subcarrier bandwidth.

SUMMARY

An apparatus comprising includes an estimator including a receiver that receives a plurality of frequency-domain symbols, each symbol including at least one of a plurality of pilot samples and a plurality of data samples. The estimator also includes a framer that observes the at least one of the plurality of pilot samples and the plurality of data samples in adjacent symbols, and a calculator that calculates an integer carrier frequency offset (CFO) estimate based on a reliability metric based on the at least one of the plurality of pilot samples and the plurality of data samples that are included in the frequency-domain symbols.

In other features the frequency-domain symbols comprise Orthogonal Frequency Division Multiplexing (OFDM) symbols, the plurality of data samples correspond to a plurality of data subcarriers in the OFDM symbols, and the plurality of pilot samples correspond to a plurality of pilot subcarriers in the OFDM symbols.

In other features the integer CFO estimate is based on:

$$\hat{L}_{PAE} = \operatorname*{argmax}_{n}\{T_p(n) + T_d(n)\},$$

where $$T_p(n) = \Re\left\{e^{-j2\pi n\alpha} \sum_{k \in S_p} V[k+n]p*[k]\right\},$$

$$T_d(n) = \sigma_Z^2 \sum_{k \in S_d} \log\left(2\cosh\left(\frac{\Re\{V[k+n]e^{-j2\pi n\alpha}\}}{\sigma_Z^2}\right) + 2\cosh\left(\frac{\Im\{V[k+n]e^{-j2\pi n\alpha}\}}{\sigma_Z^2}\right)\right),$$

$\sigma_Z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, and p represents a predetermined sequence of symbols. The OFDM symbols include virtual subcarriers. The OFDM symbols includes at least one of pilot subcarriers and data subcarriers.

In other features $T_p(n)$ is provided by one of $$T_p(n) = \sigma_Z^2 \log\left(2\cosh\left(\frac{\Re\left\{e^{-j2\pi n\alpha} \sum_{k \in S_p} V[k+n]p*[k]\right\}}{\sigma_Z^2}\right)\right) \text{ and}$$

$$T_{p,simp}(n) = \left|\Re\left\{e^{-j2\pi n\alpha} \sum_{k \in S_p} V[k+n]p*[k]\right\}\right|.$$

The OFDM symbols include pseudo-pilot subcarriers. The pseudo-pilot subcarriers are modulated by one of binary phase shift keying and differential binary phase shift keying. The pseudo-pilot subcarriers are simultaneously modified by a common value.

In other features $T_p(n)$ is provided by one of $$T_p(n) = \sigma_Z^2 \log\left[2\left(\cosh\left(\frac{\Re\left\{e^{-j2\pi n\alpha} \sum_{k \in S_p} V[k+n]p*[k]\right\}}{\sigma_Z^2}\right) + \cosh\left(\frac{\Im\left\{e^{-j2\pi n\alpha} \sum_{k \in S_p} V[k+n]p*[k]\right\}}{\sigma_Z^2}\right)\right)\right]$$

and $$T_{p,simp}(n) = \max\left\{\left|\Re\left\{e^{-j2\pi n\alpha} \sum_{k \in S_p} V[k+n]p*[k]\right\}\right|, \left|\Im\left\{e^{-j2\pi n\alpha} \sum_{k \in S_p} V[k+n]p*[k]\right\}\right|\right\},$$

where $\sigma_Z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, and p represents a predetermined sequence of symbols. The OFDM symbols include pseudo-pilot subcarriers. The pseudo-pilot subcarriers are modulated by one of quadrature phase shift keying and differential quadrature phase shift keying. The pseudo-pilot subcarriers are simultaneously modified by a common value.

In other features the integer CFO estimate is based on $$\hat{L}_{PAE} = \underset{n}{\operatorname{argmax}} \{T_p(n) + w_d T_{d,simp}(n)\},$$

where $$T_p(n) = \Re \left\{ e^{-j2\pi n\alpha} \sum_{k \in S_p} V[k+n] p * [k] \right\},$$

$T_d$, simp(n) is provided by one of $$T_{d,simp}(n) = \frac{1}{\sqrt{2}} \sum_{k \in S_p} \left( |\Re\{V[k+n]e^{-j(2\pi n\alpha + \frac{\pi}{4})}\}| + |\Im\{V[k+n]e^{-j(2\pi n\alpha + \frac{\pi}{4})}\}| \right)$$

and $$T_{d,simp}(n) = \sum_{k \in S_p} \max\{|\Re\{V[k+n]e^{-j2\pi n\alpha}\}|, |\Im\{V[k+n]e^{-j2\pi n\alpha}\}|\},$$

$\sigma_a^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, p represents a predetermined sequence of symbols, and $w_d$ represents a weighting factor.

In other features $T_p$ (n) is provided by one of $$T_p(n) = \sigma_Z^2 \log \left( 2\cosh \left( \frac{\Re\left\{ e^{-j2\pi n\alpha} \sum_{k \in S_p} V[k+n] p * [k] \right\}}{\sigma_Z^2} \right) \right) \text{ and}$$

$$T_{p,simp}(n) = \left| \Re \left\{ e^{-j2\pi n\alpha} \sum_{k \in S_p} V[k+n] p * [k] \right\} \right|.$$

The OFDM symbols include pseudo-pilot subcarriers. The pseudo-pilot subcarriers are modulated by one of binary phase shift keying and differential binary phase shift keying. The pseudo-pilot subcarriers are simultaneously modified by a common value.

In other features the integer CFO estimate is based on:

$$T_p(n) = \sigma_Z^2 \log \left[ 2 \left( \cosh\left( \frac{\Re\left\{ e^{-j2\pi n\alpha} \sum_{k \in S_p} V[k+n] p * [k] \right\}}{\sigma_Z^2} \right) + \cosh\left( \frac{\Im\left\{ e^{-j2\pi n\alpha} \sum_{k \in S_p} V[k+n] p * [k] \right\}}{\sigma_Z^2} \right) \right) \right]$$

and $$T_{p,simp}(n) = \max \left\{ \left| \Re \left\{ e^{-j2\pi n\alpha} \sum_{k \in S_p} V[k+n] p * [k] \right\} \right|, \left| \Im \left\{ e^{-j2\pi n\alpha} \sum_{k \in S_p} V[k+n] p * [k] \right\} \right| \right\},$$

where $\sigma_Z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, and p represents a predetermined sequence of symbols. The OFDM symbols include pseudo-pilot subcarriers. The pseudo-pilot subcarriers are modulated by one of differential quadrature phase shift keying and quadrature phase shift keying. The pseudo-pilot subcarriers are simultaneously modified by a common value.

In other features the integer CFO estimate is based on $$\hat{L}_{PAE} = \underset{n}{\operatorname{argmax}} \{T_p(n) + T_{p,corr}(n) + w_d T_d(n)\},$$

where $$T_p(n) = \Re \left\{ e^{-j2\pi n\alpha} \sum_{k \in S_p} V[k+n] p * [k] \right\},$$

$$T_{p,cor}(n) = \frac{1}{2}\left(1 - \frac{1}{\beta^2}\right) \sum_{k \in S_p} |V[k+n]|^2,$$

$$T_d(n) = \sigma_Z^2 \sum_{k \in S_p} \log \left( 2\cosh\left( \frac{\Re\{V[k+n]e^{-j2\pi n\alpha}\}}{\sigma_Z^2} \right) + 2\cosh\left( \frac{\Im\{V[k+n]e^{-j2\pi n\alpha}\}}{\sigma_Z^2} \right) \right)$$

where $\sigma_Z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, $\beta$ represents a boost of pilot subcarrier power, and p represents a predetermined sequence of symbols. The OFDM symbols include boosted-pilot subcarriers. The power of the boosted-pilot subcarriers is greater than the power of data subcarriers of the OFDM symbols.

In other features $T_d(n)$ is provided by one of $$T_{d,simp}(n) = \frac{1}{\sqrt{2}} \sum_{k \in S_d} \left( \left| \Re \left\{ V[k+n] e^{-j(2\pi n\alpha + \frac{\pi}{4})} \right\} \right| + \left| \Im \left\{ V[k+n] e^{-j(2\pi n\alpha + \frac{\pi}{4})} \right\} \right| \right)$$

and $$T_{d,simp}(n) = \sum_{k \in S_d} \max\{ |\Re\{V[k+n]e^{-j2\pi n\alpha}\}|, |\Im\{V[k+n]e^{-j2\pi n\alpha}\}| \}.$$

The OFDM symbols include boosted-pilot subcarriers. The power of the boosted-pilot subcarriers is greater than the power of data subcarriers of the OFDM symbols.

In other features the receiver is compliant with at least one of Institute of Electrical and Electronics Engineers (IEEE) 802.11a, 802.11g, and 802.11n, European Technical Standards Institute (ETSI) DVB-H, ETSI DVB-T, ETSI EN 300 401 V1.3.3, ETSI ES 201 980 V2.1.1, and National Radio Standards Committee (NRSC)—5.

A method of estimating an integer carrier frequency offset (CFO) in a wireless radio-frequency receiver is disclosed. The method includes receiving a plurality of frequency-domain symbols, each symbol including at least one of a plurality of pilot samples and a plurality of data samples, observing the at least one of the plurality of pilot samples and the plurality of data samples in adjacent symbols; and calculating an integer carrier frequency offset (CFO) estimate based on a reliability metric based on the at least one of the plurality of pilot samples and the plurality of data samples that are included in the frequency-domain symbols.

In other features the frequency-domain symbols comprise Orthogonal Frequency Division Multiplexing (OFDM) symbols, the plurality of data samples correspond to a plurality of data subcarriers in the OFDM symbols, and the plurality of pilot samples correspond to a plurality of pilot subcarriers in the OFDM symbols.

In other features the integer CFO estimate is based on:

$$\hat{L}_{PAE} = \arg\max_n \{T_p(n) + T_d(n)\},$$

where $$T_p(n) = \Re \left\{ e^{-j2\pi n\alpha} \sum_{k \in S_p} V[k+n] p*[k] \right\},$$

$$T_d(n) = \sigma_Z^2 \sum_{k \in S_d} \log \left( 2\cosh\left( \frac{\Re\{V[k+n]e^{-j2\pi n\alpha}\}}{\sigma_Z^2} \right) + 2\cosh\left( \frac{\Im\{V[k+n]e^{-j2\pi n\alpha}\}}{\sigma_Z^2} \right) \right),$$

$\sigma_Z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, and p represents a predetermined sequence of symbols. The OFDM symbols include virtual subcarriers. The OFDM symbols includes at least one of pilot subcarriers and data subcarriers.

In other features $T_p(n)$ is provided by one of $$T_p(n) = \sigma_Z^2 \log \left( 2\cosh\left( \frac{\Re\left\{ e^{-j2\pi n\alpha} \sum_{k \in S_p} V[k+n]p*[k] \right\}}{\sigma_Z^2} \right) \right) \text{ and}$$

$$T_{p,simp}(n) = \left| \Re \left\{ e^{-j2\pi n\alpha} \sum_{k \in S_p} V[k+n]p*[k] \right\} \right|.$$

The OFDM symbols include pseudo-pilot subcarriers. The pseudo-pilot subcarriers are modulated by one of binary phase shift keying and differential binary phase shift keying. The pseudo-pilot subcarriers are simultaneously modified by a common value.

In other features $T_p(n)$ is provided by one of $$T_p(n) = \sigma_Z^2 \log \left[ 2\left( \cosh\left( \frac{\Re\left\{ e^{-j2\pi n\alpha} \sum_{k \in S_p} V[k+n]p^*[k] \right\}}{\sigma_Z^2} \right) + \cosh\left( \frac{\Im\left\{ e^{-j2\pi n\alpha} \sum_{k \in S_p} V[k+n]p^*[k] \right\}}{\sigma_Z^2} \right) \right) \right]$$

and $$T_{p,simp}(n) = \max\left\{ \left| \Re\left\{ e^{-j2\pi n\alpha} \sum_{k \in S_p} V[k+n]p^*[k] \right\} \right|, \left| \Im\left\{ e^{-j2\pi n\alpha} \sum_{k \in S_p} v[k+n]p^*[k] \right\} \right| \right\},$$

where $\sigma_Z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, and p represents a predetermined sequence of symbols. The OFDM symbols include pseudo-pilot subcarriers. The pseudo-pilot subcarriers are modulated by one of quadrature phase shift keying and differential quadrature phase shift keying. The pseudo-pilot subcarriers are simultaneously modified by a common value.

In other features the integer CFO estimate is based on $$\hat{L}_{PAE} = \arg\max_n \{T_p(n) + w_d T_{d,simp}(n)\},$$

where $$Tk_p(n) = \Re \left\{ e^{-j2\pi n\alpha} \sum_{k \in S_p} V[k+n]p^*[k] \right\},$$

$T_d$, simp(n) is provided by one of $$T_{d,simp}(n) = \frac{1}{\sqrt{2}} \sum_{k \in S_d} \left( \left| \Re \left\{ V[k+n]e^{-j(2\pi n\alpha + \frac{\pi}{4})} \right\} \right| + \left| \Im \left\{ V[k+n]e^{-j(2\pi n\alpha + \frac{\pi}{4})} \right\} \right| \right)$$

and $$T_{d,simp}(n) = \sum_{k \in S_d} \max\{|\Re\{V[k+n]e^{-j2\pi n\alpha}\}|, |\Im\{V[k+n]e^{-j2\pi n\alpha}\}|\},$$

$\sigma_Z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, p represents a predetermined sequence of symbols, and $w_d$ represents a weighting factor.

In other features $T_p(n)$ is provided by one of $$T_p(n) = \sigma_Z^2 \log \left( 2\cosh \left( \frac{\Re \left\{ e^{-j2\pi n\alpha} \sum_{k \in S_p} V[k+n]p^*[k] \right\}}{\sigma_Z^2} \right) \right)$$

$$T_{p,simp}(n) = \left| \Re \left\{ e^{-j2\pi n\alpha} \sum_{k \in S_p} V[k+n]p^*[k] \right\} \right|.$$

The OFDM symbols include pseudo-pilot subcarriers. The pseudo-pilot subcarriers are modulated by one of binary phase shift keying and differential binary phase shift keying. The pseudo-pilot subcarriers are simultaneously modified by a common value.

In other features the integer CFO estimate is based on:

$$T_p(n) = \sigma_Z^2 \log \left[ 2 \left( \cosh \left( \frac{\Re \left\{ e^{-j2\pi n\alpha} \sum_{k \in S_p} C[k+n]p^*[k] \right\}}{\sigma_Z^2} \right) + \cosh \left( \frac{\Im \left\{ e^{-j2\pi n\alpha} \sum_{k \in S_p} V[k+n]p^*[k] \right\}}{\sigma_Z^2} \right) \right) \right]$$

and $$T_{p,simp}(n) = \max \left\{ \left| \Re \left\{ e^{-j2\pi n\alpha} \sum_{k \in S_p} V[k+n]p^*[k] \right\} \right|, \left| \Im \left\{ e^{-j2\pi n\alpha} \sum_{k \in S_p} V[k+n]p^*[k] \right\} \right| \right\},$$

where $\sigma_Z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, and p represents a predetermined sequence of symbols. The OFDM symbols include pseudo-pilot subcarriers. The pseudo-pilot subcarriers are modulated by one of differential quadrature phase shift keying and quadrature phase shift keying. The pseudo-pilot subcarriers are simultaneously modified by a common value.

In other features the integer CFO estimate is based on $$\hat{L}_{PAE} = \underset{n}{\operatorname{argmax}} \{T_p(n) + T_{p,corr}(n) + w_d T_d(n)\},$$

where $$T_p(n) = \Re \left\{ e^{-j2\pi n\alpha} \sum_{k \in S_p} V[k+n]p^*[k] \right\},$$

$$T_{p,cor}(n) = \frac{1}{2}\left(1 - \frac{1}{\beta^2}\right) \sum_{k \in S_p} |V[k+n]|^2,$$

$$T_d(n) = \sigma_Z^2 \sum_{k \in S_d} \log \left( 2\cosh\left( \frac{\Re\{V[k+n]e^{-j2\pi n\alpha}\}}{\sigma_Z^2} \right) + 2\cosh\left( \frac{\Im\{V[k+n]e^{-j2\pi n\alpha}\}}{\sigma_Z^2} \right) \right)$$

where $\sigma_Z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, $\beta$ represents a boost of pilot subcarrier power, and p represents a predetermined sequence of symbols. The OFDM symbols include boosted-pilot subcarriers. The power of the boosted-pilot subcarriers is greater than the power of data subcarriers of the OFDM symbols.

In other features $T_d(n)$ is provided by one of $$T_{d,simp}(n) = \frac{1}{\sqrt{2}} \sum_{k \in S_d} \left( \left| \Re \left\{ V[k+n]e^{-j(2\pi n\alpha + \frac{\pi}{4})} \right\} \right| + \left| \Im \left\{ V[k+n]e^{-j(2\pi n\alpha + \frac{\pi}{4})} \right\} \right| \right)$$

and $$T_{d,simp}(n) = \sum_{k \in S_d} \max\{|\Re\{V[k+n]e^{-j2\pi n\alpha}\}|, |\Im\{V[k+n]e^{-j2\pi n\alpha}\}|\}.$$

The OFDM symbols include boosted-pilot subcarriers. The power of the boosted-pilot subcarriers is greater than the power of data subcarriers of the OFDM symbols.

In other features the receiving is compliant with at least one of Institute of Electrical and Electronics Engineers (IEEE) 802.11a, 802.11g, and 802.11n, European Technical Standards Institute (ETSI) DVB-H, ETSI DVB-T, ETSI EN 300 401 V1.3.3, ETSI ES 201 980 V2.1.1, and National Radio Standards Committee (NRSC)—5.

An apparatus includes estimator means for generating an integer carrier frequency offset (CFO) estimate. The estimator means includes receiver means for receiving a plurality of frequency-domain symbols, each symbol including at least one of a plurality of pilot samples and a plurality of data samples, framer means for observing the at least one of the plurality of pilot samples and the plurality of data samples in adjacent symbols, and calculator means for calculating the integer CFO estimate based on a reliability metric based on the at least one of the plurality of pilot samples and the plurality of data samples that are included in the frequency-domain symbols.

In other features the frequency-domain symbols comprise Orthogonal Frequency Division Multiplexing (OFDM) symbols, the plurality of data samples correspond to a plurality of data subcarriers in the OFDM symbols, and the plurality of pilot samples correspond to a plurality of pilot subcarriers in the OFDM symbols.

In other features the integer CFO estimate is based on:

$$\hat{L}_{PAE} = \underset{n}{\operatorname{argmax}}\{T_p(n) + T_d(n)\},$$

where $$T_p(n) = \Re\left\{e^{-j2\pi n\alpha}\sum_{k\in S_p}V[k+n]p^*[k]\right\},$$

$$T_d(n) = \sigma_Z^2\sum_{k\in S_p}\log\left(2\cosh\left(\frac{\Re\{V[k+n]e^{-j2\pi n\alpha}\}}{\sigma_Z^2}\right) + 2\cosh\left(\frac{\Im\{V[k+n]e^{-j2\pi n\alpha}\}}{\sigma_Z^2}\right)\right)$$

$\sigma_Z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, and p represents a predetermined sequence of symbols. The OFDM symbols include virtual subcarriers. The OFDM symbols includes at least one of pilot subcarriers and data subcarriers.

In other features $T_p(n)$ is provided by one of $$T_p(n) = \sigma_Z^2\log\left(2\cosh\left(\frac{\Re\left\{e^{-j2\pi n\alpha}\sum_{k\in S_p}V[k+n]p^*[k]\right\}}{\sigma_Z^2}\right)\right) \text{ and}$$

$$T_{p,simp}(n) = \left|\Re\left\{e^{-j2\pi n\alpha}\sum_{k\in S_p}V[k+n]p^*[k]\right\}\right|.$$

The OFDM symbols include pseudo-pilot subcarriers. The pseudo-pilot subcarriers are modulated by one of binary phase shift keying and differential binary phase shift keying. The pseudo-pilot subcarriers are simultaneously modified by a common value.

In other features $T_p(n)$ is provided by one of $$T_p(n) = \sigma_Z^2\log\left[2\left(\cosh\left(\frac{\Re\left\{e^{-j2\pi n\alpha}\sum_{k=S_p}V[k+n]p^*[k]\right\}}{\sigma_Z^2}\right) + \cosh\left(\frac{\Im\left\{e^{-j2\pi n\alpha}\sum_{k\in S_p}V[k+n]p^*[k]\right\}}{\sigma_Z^2}\right)\right)\right]$$

and $$T_{p,simp}(n) = \max\left\{\left|\Re\left\{e^{-j2\pi n\alpha}\sum_{k\in S_p}V[k+n]p^*[k]\right\}\right|, \left|\Im\left\{e^{-j2\pi n\alpha}\sum_{k\in S_p}V[k+n]p^*[k]\right\}\right|\right\},$$

where $\sigma_Z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, and p represents a predetermined sequence of symbols. The OFDM symbols include pseudo-pilot subcarriers. The pseudo-pilot subcarriers are modulated by one of quadrature phase shift keying and differential quadrature phase shift keying. The pseudo-pilot subcarriers are simultaneously modified by a common value.

In other features the integer CFO estimate is based on $$\hat{L}_{PAE} = \underset{n}{\operatorname{argmax}}\{T_p(n) + w_d T_{d,simp}(n)\},$$

where $$T_p(n) = \Re\left\{e^{-j2\pi n\alpha}\sum_{k\in S_p}V[k+n]p^*[k]\right\},$$

$T_{d,simp}(n)$ is provided by one of $$T_{d,simp}(n) = \frac{1}{\sqrt{2}}\sum_{k\in S_d}\left(\left|\Re\{V[k+n]e^{-j(2\pi n\alpha+\frac{\pi}{4})}\}\right| + \left|\Im\{V[k+n]e^{-j(2\pi n\alpha+\frac{\pi}{4})}\}\right|\right)$$

and $$T_{d,simp}(n) = \sum_{k\in S_d}\max\{|\Re\{V[k+n]e^{-j2\pi n\alpha}\}|, |\Im\{V[k+n]e^{-j2\pi n\alpha}\}|\},$$

$\sigma_Z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, p represents a predetermined sequence of symbols, and $w_d$ represents a weighting factor.

In other features $T_p(n)$ is provided by one of $$T_p(n) = \sigma_Z^2\log\left(2\cosh\left(\frac{\Re\left\{e^{-j2\pi n\alpha}\sum_{k\in S_p}V[k+n]p^*[k]\right\}}{\sigma_Z^2}\right)\right) \text{ and}$$

$$T_{p,simp}(n) = \left|\Re\left\{e^{-j2\pi n\alpha}\sum_{k\in S_p}V[k+n]p^*[k]\right\}\right|.$$

The OFDM symbols include pseudo-pilot subcarriers. The pseudo-pilot subcarriers are modulated by one of binary phase shift keying and differential binary phase shift keying. The pseudo-pilot subcarriers are simultaneously modified by a common value.

In other features the integer CFO estimate is based on:

$$T_p(n) = \sigma_Z^2 \log\left[2\left(\cosh\left(\frac{\Re\left\{e^{-j2\pi n\alpha}\sum_{k\in S_p}V[k+n]p^*[k]\right\}}{\sigma_Z^2}\right) + \cosh\left(\frac{\Im\left\{e^{-j2\pi n\alpha}\sum_{k\in S_p}V[k+n]p^*[k]\right\}}{\sigma_Z^2}\right)\right)\right]$$ and $$T_{p,simp}(n) = \max\left\{\left|\Re\left\{e^{-j2\pi n\alpha}\sum_{k\in S_p}V[k+n]p^*[k]\right\}\right|, \left|\Im\left\{e^{-j2\pi n\alpha}\sum_{k\in S_p}V[k+n]p^*[k]\right\}\right|\right\},$$

where $\sigma_Z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, and p represents a predetermined sequence of symbols. The OFDM symbols include pseudo-pilot subcarriers. The pseudo-pilot subcarriers are modulated by one of differential quadrature phase shift keying and quadrature phase shift keying. The pseudo-pilot subcarriers are simultaneously modified by a common value.

In other features the integer CFO estimate is based on $$\hat{L}_{PAE} = \underset{n}{\text{argmax}}\{T_p(n) + T_{p,corr}(n) + w_d T_d(n)\},$$

where $$T_p(n) = \Re\left\{e^{-j2\pi n\alpha}\sum_{k\in S_p}V[k+n]p^*[k]\right\},$$

$$T_{p,cor}(n) = \frac{1}{2}\left(1 - \frac{1}{\beta^2}\right)\sum_{k\in S_p}|V[k+n]|^2,$$

$$T_d(n) = \sigma_Z^2 \sum_{k\in S_d}\log\left(2\cosh\left(\frac{\Re\{V[k+n]e^{-j2\pi n\alpha}\}}{\sigma_Z^2}\right) + 2\cosh\left(\frac{\Im\{V[k+n]e^{-j2\pi n\alpha}\}}{\sigma_Z^2}\right)\right)$$

where $\sigma_Z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, $\beta$ represents a boost of pilot subcarrier power, and p represents a predetermined sequence of symbols. The OFDM symbols include boosted-pilot subcarriers. The power of the boosted-pilot subcarriers is greater than the power of data subcarriers of the OFDM symbols.

In other features $T_d(n)$ is provided by one of $$T_{d,simp}(n) = \frac{1}{\sqrt{2}}\sum_{k\in S_d}\left(\left|\Re\left\{V[k+n]e^{-j(2\pi n\alpha+\frac{\pi}{4})}\right\}\right| + \left|\Im\left\{V[k+n]e^{-j(2\pi n\alpha+\frac{\pi}{4})}\right\}\right|\right)$$

and $$T_{d,simp}(n) = \sum_{k\in S_d}\max\{|\Re\{V[k+n]e^{-j2\pi n\alpha}\}|, |\Im\{V[k+n]e^{-j2\pi n\alpha}\}|\}.$$

The OFDM symbols include boosted-pilot subcarriers. The power of the boosted-pilot subcarriers is greater than the power of data subcarriers of the OFDM symbols.

In other features the receiver means is compliant with at least one of Institute of Electrical and Electronics Engineers (IEEE) 802.11a, 802.11g, and 802.11n, European Technical Standards Institute (ETSI) DVB-H, ETSI DVB-T, ETSI EN 300 401 V1.3.3, ETSI ES 201 980 V2.1.1, and National Radio Standards Committee (NRSC)—5.

DETAILED DESCRIPTION

Figure 1:
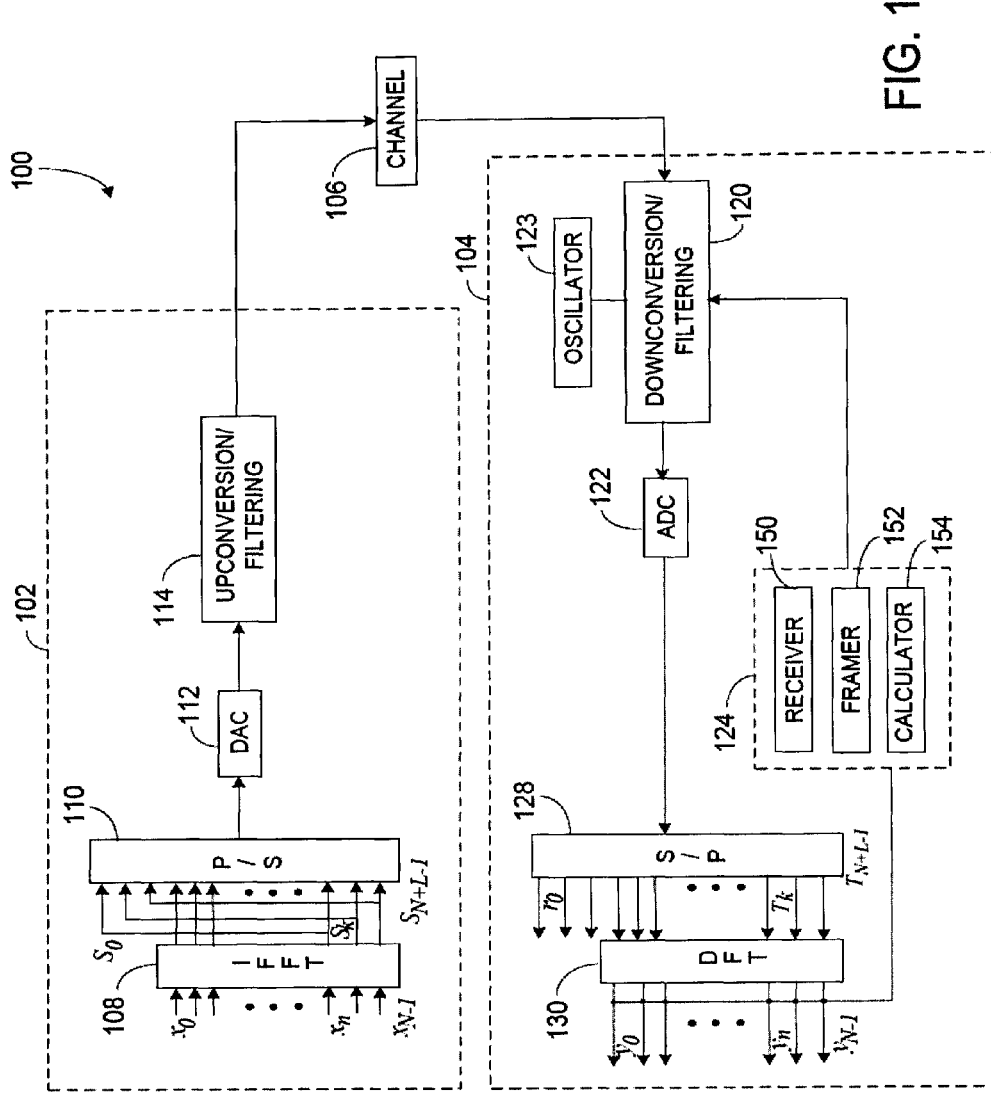
FIG. 1 is a block diagram of a wireless system according to an embodiment.

FIG. 1 shows a wireless communication system 100 according to an embodiment. The wireless communication system includes a transmitter 102 and a receiver 104 that communicate over a wireless channel 106. The transmitter 102 and receiver 104 may be implemented in two different transceivers, each transceiver including both a transmitter section and a receiver section.

The wireless communication system 100 may be implemented in a wireless local Area Network (WLAN) that complies with the IEEE 802.11 standards (including IEEE 802.11a, 802.11g, and 802.11n). The IEEE 802.11 standards describe OFDM systems and the protocols used by such systems.

In an OFDM system, a data stream is split into multiple substreams, each of which is sent over a different subcarrier frequency (also referred to as a "tone"). For example, in IEEE 802.11a systems, OFDM symbols include 64 tones (with 48 active data tones) indexed as $\{-32, -31, \ldots, -1, 0, 1, \ldots, 30, 31\}$, where 0 is the DC tone index. The DC tone is not used to transmit information.

The transmitter 102 may generate OFDM symbols for transmission to the receiver 104. An inverse fast Fourier transform (IFFT) module 108 may generate the m-th OFDM symbol $x_m[n]$ by performing an N-point IFFT on the information symbols $X_m[k]$ for $k=0, 1, \ldots, N-1$. A cyclic prefix may be added to the body of the OFDM symbol to avoid interference (ISI) and preserve orthogonality between subcarriers. The cyclic prefix may include copies of the last $N_g$ samples of the N time-domain samples. The cyclic prefix is appended as a preamble to the IFFT of $X_m[k]$ to form the complete OFDM symbol with $N_t = N_g + N$ samples.

The OFDM symbols are converted to a single data stream by a parallel-to-serial (P/S) converter 110 and concatenated serially. The discrete symbols are converted to analog signals by a digital-to-analog converter (DAC) 112 and lowpass filtered for radio frequency (RF) upconversion by an RF module 114.

The OFDM symbols are transmitted through the wireless channel $h_m[n]$ 106 over a carrier to the receiver 104, which performs the inverse process of the transmitter 102. The carrier may be corrupted by Gaussian noise $z_m[n]$ in the channel, which is assumed to be block stationary, i.e., time-invariant during each OFDM symbol.

At the receiver 104, the passband signal is downconverted and filtered by an RF module 120 and converted to a digital data stream by an analog-to-digital converter (ADC) 122.

The RF module includes a local oscillator 123. When the local oscillator frequency $f_i$ is not matched to the carrier frequency $f_c$ of the received signal, a carrier frequency offset $\Delta f = f_c - f_i$ will appear. In addition, there may also be a phase offset $\theta_0$. The received symbol $y_m[n]$ can then be represented as $$y_m[n] = e^{j[2\pi\Delta f(n+m(N+N_g))T+\theta_0]}(h_m[n]*x_m[n])+z_m[n], \quad (1)$$

where T is the sampling period, and $z_m[n]$ is a zero-mean complex-Gaussian random variable with variance $\sigma_z^2$.

The frequency offset $\Delta f$ can be represented with respect to the subcarrier bandwidth $1/NT$ by defining the relative frequency offset $\epsilon$ as $$\varepsilon \triangleq \frac{\Delta f}{1/NT} = \Delta f NT, \quad (2)$$

With the above definition of the relative frequency offset $\epsilon$, the received symbol $y_m[n]$ can be expressed as $$y_m[n] = e^{j\frac{2\pi\varepsilon n}{N}} e^{j2\pi\varepsilon m(1+\alpha)} e^{j\theta_0}(h_m[n]*x_m[n])+z_m[n], \quad (3)$$

where $$\alpha = \frac{N_g}{N}.$$

The relative frequency offset $\epsilon$ can be divided into an integer part $l$ and a fractional part $\bar{\epsilon}$ such that $$\epsilon = l + \bar{\epsilon}, \quad (4)$$

where $l$ is an integer and $-\frac{1}{2} \leq \bar{\epsilon} \leq \frac{1}{2}$.

When the fractional frequency offset is equal to zero, the discrete Fourier transform (DFT) of $y_m[n]$ can be expressed as $$Y_m[k] = e^{j(2\pi lm\alpha + \theta_0)} H_m[k-l] X_m[k-l] + Z_m[k], \quad (5)$$

where $H_m[n]$ and $Z_m[n]$ are the DFTs of $h_m[n]$ and $z_m[n]$, respectively. In Equation (5) it is assumed that $H_m[n]$ and $X_m[n]$ are periodic with period N to simplify the notation. Similarly, $Y_m[n]$ is also be assumed to be periodic.

As can be seen in Equation (5), the integer frequency offset $l$ causes a cyclic shift and a phase change of the received signal. In an embodiment, an estimator 124 may be used to estimate the integer frequency offset $l$. The fractional part $\bar{\epsilon}$ of the relative frequency offset may be calculated separately. The estimated integer frequency offset $\hat{l}$ may be fed back to the downconverter 120 to correct any cyclic shift in the subcarriers. The data stream is then converted into parallel substreams by a serial-to-parallel (S/P) converter 128 and transformed into N tones by an FFT module 130.

In an embodiment, the estimator 124 may perform either pilot-aided estimation or blind estimation of the integer frequency offset $l$, i.e., with or without the aid of pilot subcarriers. In a pilot-aided OFDM system, the subcarriers include pilot subcarriers, data subcarriers, and unused subcarriers. In a blind OFDM system, the subcarriers do not include pilot subcarriers and the estimators utilize redundant information in the data subcarriers to estimate the carrier frequency offset.

In the following equations, $S_1$ and $S_2$ represent the set of indices for pilot subcarriers and data subcarriers, respectively. The number of elements in $S_1$ and $S_2$ are $N_1$ and $N_2$, respectively. Depending on the particular OFDM system and OFDM symbol, $N_1$ or $N_2$ may be zero.

The transmit symbols satisfy the following relationship:

$$X_{m-1}^*[k]X_m[k] = \begin{cases} A_m[k] & \text{for } k \in S_1 \\ B_m[k] & \text{for } k \in S_2, \end{cases} \quad (6)$$

where $A_m[k]$ is a sequence known to the receiver, $B_m[k]$ is a random sequence unknown to the receiver, and $A_m[k]$ and $B_m[k]$ are assumed to have power of 1.

In an embodiment, the ML estimator for the integer frequency offset l is derived for the additive white Gaussian noise (AWGN) channel. For the AWGN channel, the received signal can represented as follows:

$$Y_m[k] = e^{j(2\pi lm\alpha + \theta_0)} X_m[k-l] + Z_m[k]. \quad (7)$$

Since the phase $\theta_0$ is unknown to the receiver, $Y_m[k]$ is multiplied by $Y^*_{m-1}[k]$ to remove the phase term $\theta_0$ from the desired signal $$X_m[k-l] \text{ and } X_{m-1}[k-l]: \quad (8)$$

$$V_m[k] = Y^*_{m-1}[k]Y_m[k]$$
$$= e^{j2\pi lm\alpha} X^*_{m-1}[k-l] \cdot X_m[k-l] + Z'_m[k]$$

where the noise $Z'_m[k]$ is $$Z'_m[k] = e^{-j(2\pi l(m-1)\alpha + \theta_0)} X^*_{m-1}[k-l] Z_m[k] + \quad (9)$$
$$e^{j(2\pi lm\alpha + \theta_0)} X_m[k-l] Z^*_{m-1}[k] + Z^*_{m-1}[k]Z_m[k]$$

For the derivation of a closed-form ML estimator, it may be assumed that $Z^*_{m-1}[k]Z_m[k]$ is negligible compared to the other terms in Equation (9). This assumption may be valid when the SNR is high. Under this assumption, $Z'_m[k]$ will approximately follow a Gaussian distribution.

The estimator 124 performs an ML estimation of the integer frequency offset using samples in an observation window. Let V be an observation vector comprised of the observations $V_m[0], V_m[1], \ldots, V_m[N-1]$, i.e., $V=[V_m[0]V_m[1]\ldots V_m[N-1]]$. The ML estimate of l given the observation V is the integer n that maximizes the following statistic:

$$T_1(n) = f(V|l=n), \quad (10)$$

where f is the conditional probability density function (pdf) of V given l=n. Since the observation vector V depends not only on the integer frequency offset l but also on the values of the data symbols $B_m[k]$ for $k_i \in S_2$, the conditional pdf $f(V|B=b, l=n)$ can be rewritten as follows:

$$T_1(n) = \sum_{all\_b} f(V|B=b, l=n) P\{B=b\}, \quad (11)$$

where $B=[B_m[k_1], B_m[k_2], \ldots, B_m[k_{N_2}]]$ for $k_i \in S_2$ and $b=[b_m[k_1], b_m[k_2], \ldots, b_m[k_{N_2}]]$ represents the actual value assumed by the random vector B. It may be assumed that the data subcarriers are modulated using the quadrature phase shift key (QPSK) technique. The ML estimator for the other constellations can be derived in a similar manner.

Since $P\{B=b\}=2^{-2N_2}$ for QPSK, the following $T_2(n)$ can be used instead of $T_1(n)$ for the ML estimation:

$$T_2(n) = \sum_{all\_b} f(V|B=b, l=n). \quad (12)$$

Since the received signal in each subcarrier is independent of one another, the conditional pdf $f(V|B=b, l=n)$ becomes $$f(V|B=b, l=n) = \quad (13)$$
$$\prod_{k \in S_1} f_{z'}(V[k+n] - e^{j2\pi n\alpha} A[k]) \cdot \prod_{k \in S_2} f_{z'}(V[k+n] - e^{j2\pi n\alpha} b[k])$$

where $$f_{Z'}(x) = \frac{1}{2\pi\sigma_Z^2} e^{\frac{-|z|^2}{2\sigma_Z^2}}. \quad (14)$$

From Equation (14), it can be shown that $$f_{z'}(V[k+n] - e^{j2\pi n\alpha} A[k]) = \quad (15)$$
$$\frac{1}{2\pi\sigma_Z^2} e^{-\frac{|V[k+n]|^2 + |A[k]|^2}{2\sigma_Z^2}} e^{\frac{\Re\{V[k+n]e^{-j2\pi n\alpha} A*[k]\}}{\sigma_Z^2}},$$

where $\Re\{x\}$ denotes the real part of x. Using the expression in Equation (13) and removing all factors that are independent of n, it can be shown that the ML estimator maximizes $T_3(n)$:

$$T_3(n) = \quad (16)$$
$$\sum_{all\_b} \left( \prod_{k \in S_1} e^{\frac{\Re\{V[k+n]e^{-j2\pi n\alpha} A*[k]\}}{\sigma_Z^2}} \right) \left( \prod_{k \in S_2} e^{\frac{\Re\{V[k+n]e^{-j2\pi n\alpha} b*[k]\}}{\sigma_Z^2}} \right).$$

Since each $b[k_i]$ for $k_i \in S_2$ can take only the values $\pm 1$ and $\pm j$ and the $b[k_i]$ values are independent of one another, $T_3(n)$ can be rewritten as $$T_3(n) = \prod_{k \in S_1} e^{\frac{\Re\{V[k+n]e^{-j2\pi n\alpha} A*[k]\}}{\sigma_Z^2}} \cdot \quad (17)$$
$$\prod_{k \in S_2} 2\left( \cosh\left( \frac{\Re\{V[k+n]e^{-j2\pi n\alpha} A*[k]\}}{\sigma_Z^2} \right) + \cosh\left( \frac{\Im\{V[k+n]e^{-j2\pi n\alpha} A*[k]\}}{\sigma_Z^2} \right) \right)$$

where $\Im\{x\}$ denotes the imaginary part of x. By taking the logarithm of $T_3(n)$, removing the constant terms, and multiplying by $\alpha_Z^2$, it can be shown that the ML estimate of the integer frequency offset given the observation V is $$\hat{l} = \underset{n}{\operatorname{argmax}}\{T(n)\}, \quad (18)$$

where $$T(n) = \sum_{k \in S_1} \Re \{V[k+n]e^{-j2\pi n\alpha} A*[k]\} + \quad (19)$$

$$\sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right)$$

for a pilot-aided estimator (PAE) and $$T(n) = \sum_{k \in S_2} \sigma_Z^2 \log\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right) \quad (20)$$

for a blind estimator (BE).

Figure 2:
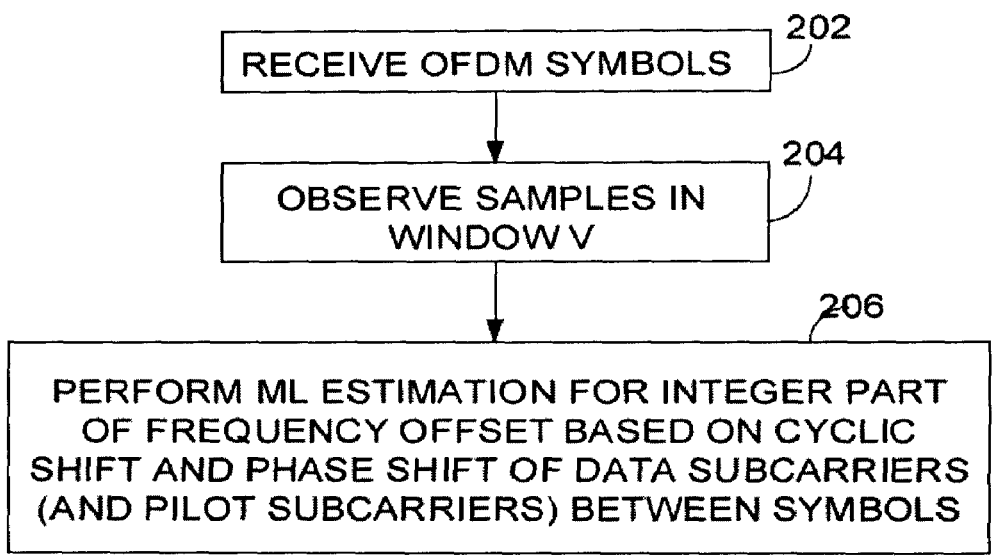
FIG. 2 is a flowchart describing an integer carrier offset estimation operation according to an embodiment.

FIG. 2 is a flowchart describing an ML estimation of the integer frequency offset according to an embodiment. The receiver 104 receives OFDM symbols from the channel (block 202). The cyclic prefix is removed and FFT performed on the symbols. The estimator 124 then observes samples in the observation window V (block 204). The estimator 124 uses the fact that the integer carrier frequency offset causes a phase shift over two OFDM symbols and a cyclic shift of the subcarriers to calculate the estimated integer frequency offset (block 206). The cyclic shift of the subcarriers is reflected on the shift of the index of V[k] in the calculation of T(n), whereas the phase shift over two OFDM symbols is exploited as follows. In the first summation in Equation (19), each term measures the component of the observation V[k+n] for $k_i \in S_1$ in the direction of $e^{j2\pi n\alpha}A[k]$. In the absence of noise, each term should be equal to 1 when the estimate is equal to the actual integer frequency offset l. However, it will have a value less than 1 when the estimate n is different from l. In the second summation, each term measures the magnitude of the observation V[k+n] for $k_i \in S_2$ in the direction of $\pm e^{j2\pi n\alpha}$ and $$\pm e^{j(2\pi n\alpha + \frac{\pi}{2})}$$

takes the average with a function comprised of log and cosh. In the absence of noise, each term should be equal to $$\delta_Z^2 \log\left(\cosh\left(\frac{1}{\sigma_Z^2}\right)\right)$$

when (n−l)α is an integer multiple of $$\frac{1}{4}.$$

It will have a smaller value otherwise.

The estimator 124 can use the ML estimator of Equations (18), (19), and (20) to perform "exact" ML estimation of the integer frequency offset. The estimator may also perform an approximate ML estimation of the integer frequency offset by simplifying the statistic T(n) for high SNR. Equation (19) can be simplified by noting that $$\cosh(x) + \cosh(y) = \frac{1}{2}(e^x + e^{-x} + e^y + e^{-y}) \approx \frac{1}{2}e^{\max\{|x|,|y|\}}, \quad (21)$$

For $|x|\gg|y|\gg 0$ or $|y|\gg|x|\gg 0$. With this approximation, the pilot-aided estimator (PAE) can be represented as:

$$\hat{l} = \underset{n}{\operatorname{argmax}}\left\{\sum_{k \in S_1} \Re \{V[k+n]e^{-j2\pi n\alpha} A*[k]\} + \sum_{k \in S_2} \{|\Re\{V[k+n]e^{-j2\pi n\alpha}\}|, |\Im\{V[k+n]e^{-j2\pi n\alpha}\}|\}\right\}. \quad (22)$$

For a blind estimator (BE), Equation (21) becomes $$\hat{l} = \underset{n}{\operatorname{argmax}}\left\{\sum_{k \in S_1} \max\{|\Re \{V[k+n]e^{-j2\pi n\alpha}\}|, |\Im\{V[k+n]e^{-j2\pi n\alpha}\}|\}\right\}. \quad (23)$$

The performance of the exact ML estimators of Equations (18), (19), and (20) and the approximate ML estimators of Equations (22) and (23) are compared with the performance of known PAEs and BEs in FIGS. 3-6. The known estimators are described in T. M. Schmidl and D.C. Cox, "Blind synchronisation for OFDM," Electronics Letters, vol. 33, pp. 113-114, January 1997, T. M. Schmidl and D. C. Cox, "Robust frequency and timing synchronization for OFDM," IEEE Trans. Commun., vol. 45, pp. 1613-1621, December 1997, M. Morelli, A. N. D'Andrea, and U. Mengali, "Frequency ambiguity resolution in OFDM systems," IEEE Commun. Lett., vol. 4, pp. 134-136, April 2000.

Schmidl's PAE is given by $$\hat{l} = \underset{n}{\operatorname{argmax}}\left\{\left|\sum_{k \in S_2} V[k+n]A*[k]\right|^2\right\}, \quad (24)$$

and Schmidl's BE is given by $$\hat{l} = \underset{n}{\operatorname{argmax}}\left\{\sum_{k \in S_2} \frac{(V[k]e^{-j2\pi n\alpha})^4}{|V[k]|^3}\right\}. \quad (25)$$

Morelli's PAE is given by $$\hat{l} = \underset{n}{\arg\max} \quad (26)$$

$$\left\{\sum_{k \in S_1} \Re \{V[k+n]e^{-j2\pi n\alpha}A^*[k]\} + \frac{1}{2}\sum_{k \in S_1 \cup S_2}\sum_{i=m-1}^{m} |Y_i[k+n]|^2\right\},$$

and Morelli's BE is given by $$\hat{l} = \arg\max_{n}\left\{\sum_{k\in S_2}\sum_{i=m-1}^{m}|Y_i[k+n]|^2\right\}. \quad (27)$$

The following parameters were chosen for the simulations. The symbol in each subcarrier is taken from a QPSK constellation. The number of data samples N and the number of cyclic prefix samples $N_g$ in one OFDM symbol are 256 and 14, respectively, resulting in cyclic prefix width ratio α of $$\frac{N_g}{N} = \frac{7}{128}.$$

The maximum magnitude of the integer frequency offset is chosen as 4. The number of pilot subcarriers $N_1$ is fixed at 7, whereas the number of data subcarriers $N_2$ is chosen to be either 249 or 241. Thus, the number of used subcarriers $N_u = N_1 + N_2$ is either 256 or 248.

Figure 3:
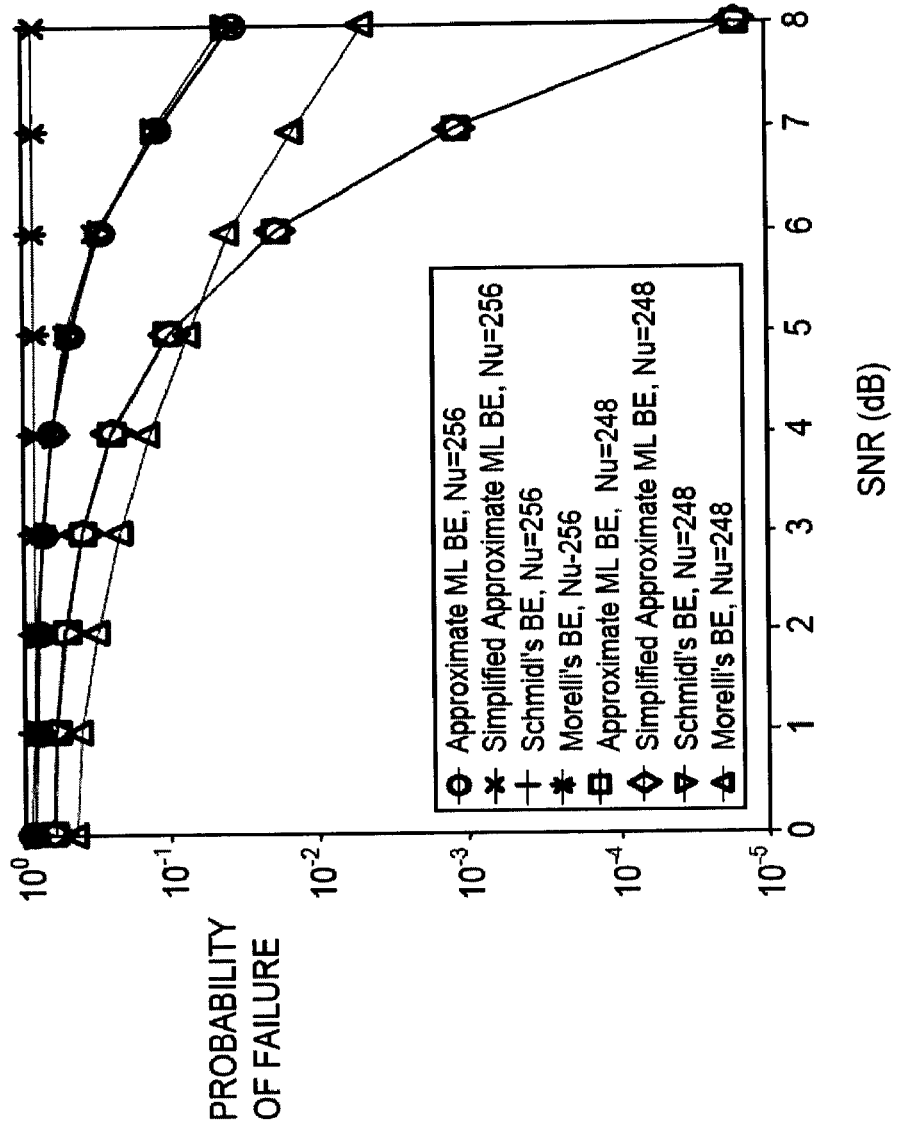
FIG. 3 is a plot showing the performance of blind estimators for an additive white Gaussian noise (AWGN) channel.

FIG. 3 illustrates the probability of the failure of the BEs for the AWGN channel. Schmidl's, Morelli's, exact ML, and approximate ML BEs are compared. For $N_u$=256, Schmidl's BE performs much better than Morelli's BE. This can be explained as follows. When all the subcarriers are used, a rotation of the subcarriers cannot be detected by measuring the energy of used subcarriers, i.e., the summation in Morelli's BE is constant regardless of n. The approximate ML BE, which uses both the phase shift property and the subcarrier rotation property, performs as well as Schmidl's BE. As can be seen from the plot, there is little loss in performance when the approximate ML BE is used instead of the exact ML BE. For $N_u$=248, the performance of Schmidl's BE almost remains the same as for $N_u$=256, whereas the performance of Morelli's BE improves significantly because Morelli's BE uses the property that the integer frequency offset causes a cyclic shift of subcarriers. However, Morelli's BE is outperformed by the exact and approximate ML BEs for high SNR. As expected from $N_u$=248, the performance of the approximate ML BE is almost as good as that of the exact ML BE for $N_u$=256.

Figure 4:
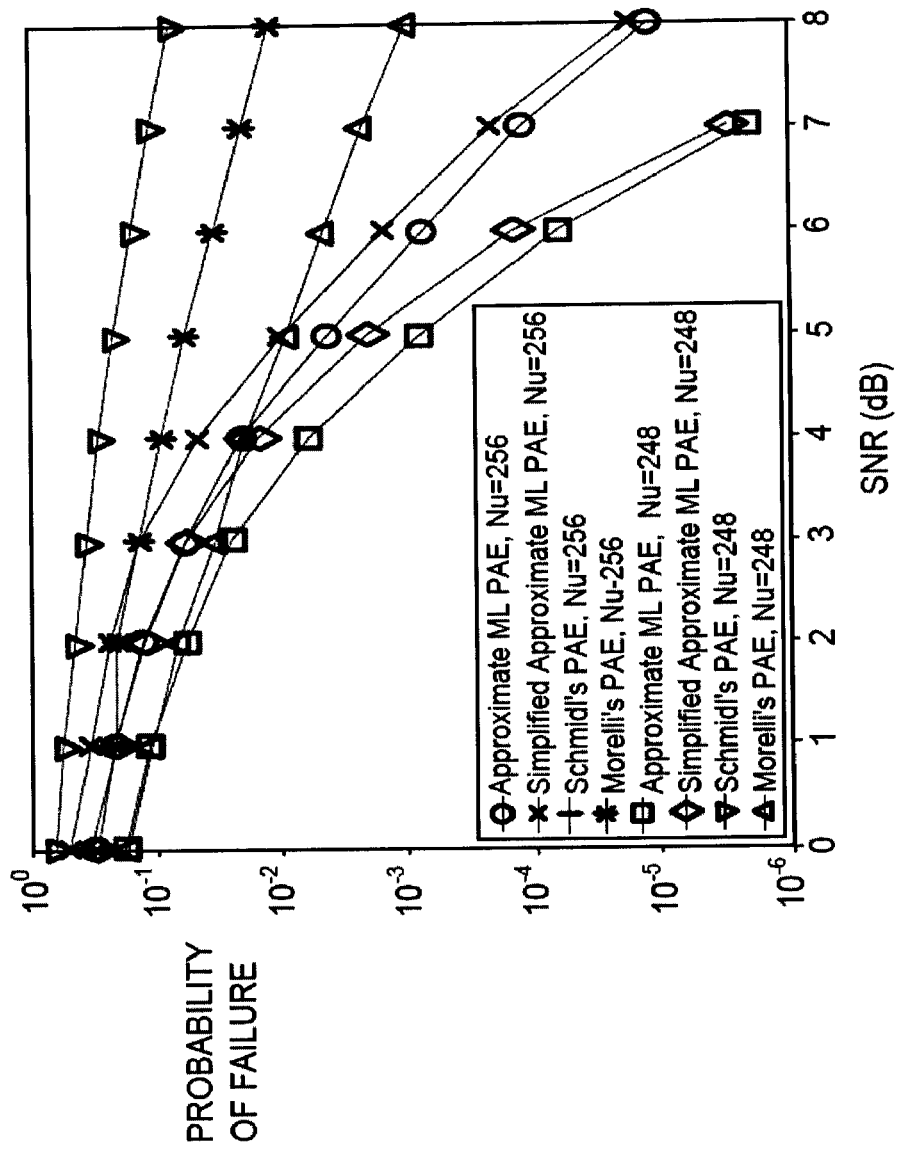
FIG. 4 is a plot showing the performance of pilot-aided estimators for an AWGN channel.

FIG. 4 illustrates the probability of the failure of the PAEs for the AWGN channel. Schmidl's PAE performance does not depend of the number of used subcarriers $N_u$, but only on the number of the pilot subcarriers $N_1$. On the other hand, the performance of Morelli's PAE and the ML PAEs depend not only on $N_1$ but also $N_u$. Since Morelli's PAE and the ML PAEs exploit the fact that the frequency offset causes a cyclic shift of subcarriers, the performance of Morelli's PAE and the ML PAEs is better for $N_u$=248 than for $N_u$=256. It can also be seen from the from the plot that Schmidl's PAE performs worse than both Morelli's PAE and the approximate ML PAE, and Morelli's PAE is outperformed by the approximate ML PAE for high SNR. Unlike the case for the blind estimators, the performance difference between the exact ML PAE and the approximate ML PAE is not negligible. However, the performance difference decreases as the SNR increases, as expected.

Figure 5:
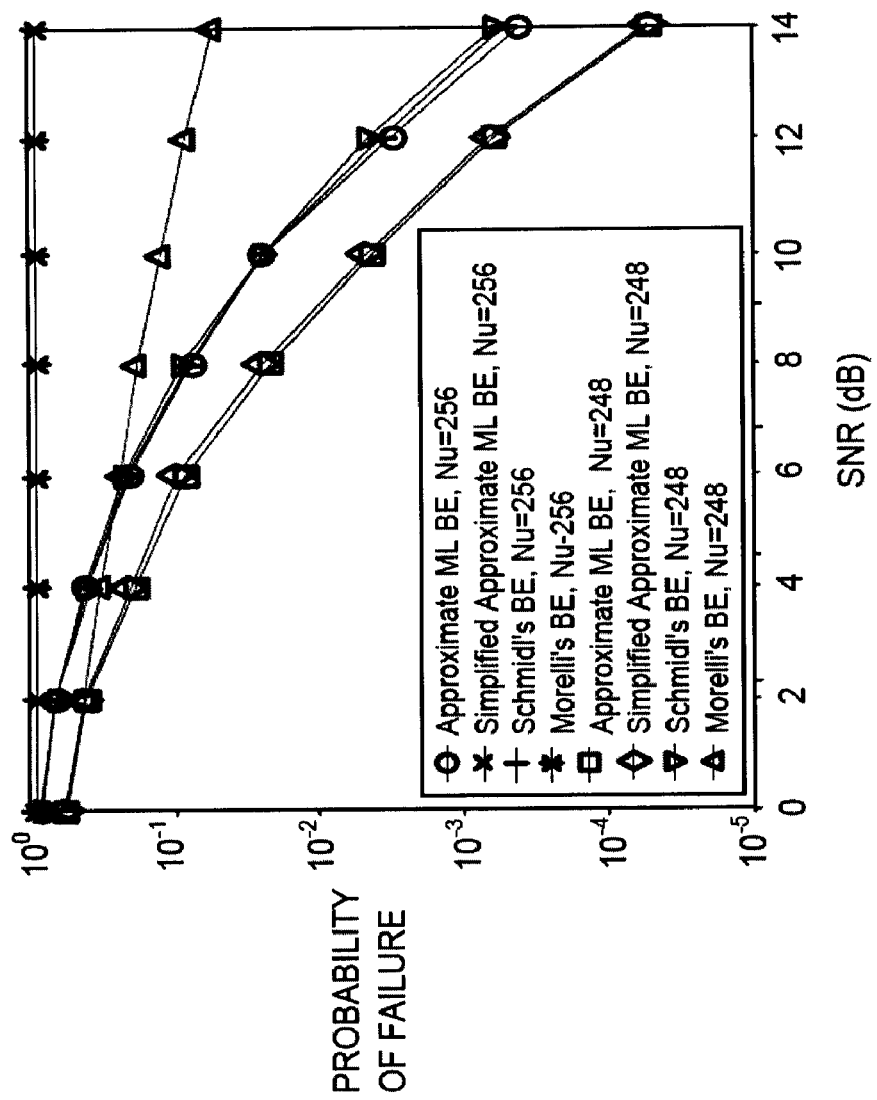
FIG. 5 is a plot showing the performance of blind estimators for multipath fading channels.
Figure 6:
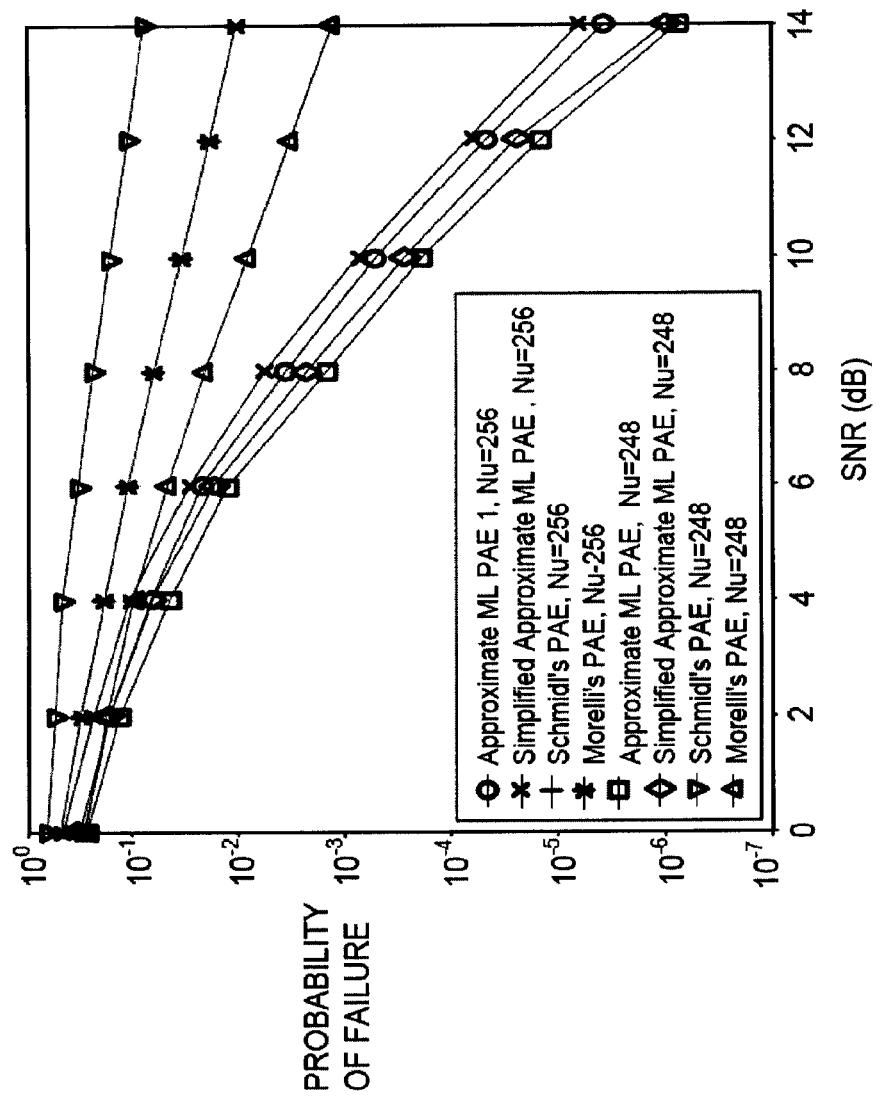
FIG. 6 is a plot showing the performance of pilot-aided estimators for multipath fading channels.

FIGS. 5 and 6 show the probability of failure of the BEs and PAEs, respectively, for multipath fading channels. The multipath channel used in the simulation includes fifteen paths, each of which vary independently of each other with magnitude following the Rayleigh distribution and phase following the uniform distribution. The fifteen paths have an exponential power delay profile, and the root-mean-square delay spread of the multipath channel is two samples.

The simulation results for the multipath fading channel are similar to the results for the AWGN channel except that Morelli's BE performs worse than Schmidl's BE for $N_u$=248 and SNR larger than 6 dB. These results indicate that the exact and approximate ML estimators developed for the AWGN channel perform better than existing estimators even for the multipath channel, and especially for high SNR.

Estimating the integer CFO/based on pseudo-pilot signals, boosted pilot signals, and virtual subcarriers will now be described. The descriptions assume that the fractional CFO is corrected.

In wireless communication system 100 (see FIG. 1) the received symbol may include a phase offset Δθ and be represented as $$y_m[n]=e^{j[2\pi\Delta f(n+m(N+N_g))T+\Delta\theta]}(h_m[n]*x_m[n])+z_m[n], \quad (28)$$

where T is the sampling period, and $z_m[n]$ is a zero-mean complex-Gaussian random variable with variance $\sigma_z^2$ that is independent of the transmit signal and channel 106.

As shown above, the frequency offset Δf can be represented with respect to the subcarrier bandwidth 1/NT by defining the normalized CFO ε (Equation 2). The received symbol $y_m[n]$ can then be expressed as $$y_m[n]=e^{j2\pi\epsilon n/N}e^{j2\pi\epsilon m(1+\alpha)}e^{j\Delta\theta}(h_m[n]*x_m[n])+z_m[n], \quad (29)$$

where $$\alpha = \frac{N_g}{N}.$$

The normalized CFO ε can be divided into an integer CFO l and a fractional CFO $\tilde{\epsilon}$ such that $-\frac{1}{2}\leq\tilde{\epsilon}<\frac{1}{2}$:

$$\epsilon = l + \tilde{\epsilon}, \quad (30)$$

where l is an integer. When the fractional CFO is equal to zero, Equation (29) becomes $$y_m[n] = e^{j2\pi lm(1+\alpha)}e^{j\Delta\theta}e^{j\frac{2\pi ln}{N}}(h_m[n]*x_m[n]) + z_m[n] \quad (31)$$
$$= e^{j(2\pi lm\alpha+\Delta\theta)}e^{j\frac{2\pi ln}{N}}(h_m[n]*x_m[n]) + z_m[n].$$

Therefore, the discrete Fourier transform (DFT) of $y_m[n]$ can be expressed as $$Y_m[k]=e^{j(2\pi lm\alpha+\Delta\theta)}H_m[k-l]X_m[k-l]+Z_m[k], \quad (32)$$

where $H_m[k]$ and $Z_m[k]$ are the DFTs of $h_m[n]$ and $z_m[n]$, respectively. Equation (32) assumes that $H_m[k]$ and $X_m[k]$ are periodic with period N to simplify the notation. Similarly, $Y_m[k]$ is also assumed to be periodic.

Equation (32) shows that the integer CFO/has two effects on the received signal. First, integer CFO/causes a cyclic shift of the received signal. The signal transmitted at subcarrier k is received at subcarrier k+l. Second, the integer CFO l causes a phase change proportional to the OFDM symbol number. The phase of the desired signal is changed by 2πlmα for all subcarriers. In addition to the integer CFO l, the phase offset also changes the phase of the desired signal by Δθ.

Some OFDM transmitters insert predetermined data into pilot tones, whereas other OFDM transmitters do not employ pilot tones. Techniques are described below for estimating the integer CFO based on the pilot subcarriers, which can aid integer CFO estimation. Techniques are also described below for blindly estimating the integer CFO when pilot subcarriers are not employed.

For both pilot-aided estimation and blind estimation the problem is considered in a general context. Let $S_p$ and $S_d$ be the set of indices of the pilot subcarriers and of the data subcarriers, respectively, and let the number of elements in $S_p$ and $S_d$ be $N_p$ and $N_d$. Depending on the particular OFDM system and OFDM symbol, $N_p$ or $N_d$ can be zero. It is assumed that $N_p+N_d=N$, where N is the number of the subcarriers of the OFDM system. For $k \in S_p$, $X_m[k]$ is known to receiver 104, whereas for $k \in S_d$, receiver 104 receiver knows the constellation that is used to transmit the data symbol $X_m[k]$, but not the exact symbol value. Then the transmit symbols satisfy the relationship $$X^*_{m-1}[k]X_m[k] = \begin{cases} p_m[k] & \text{for } k \in S_p \\ D_m[k] & \text{for } k \in S_d \end{cases}, \quad (33)$$

where $p_m[k]$ is a sequence known to the receiver and $D_m[k]$ is a random sequence that depends on the user data $X[k]$. $D_m[k]$ is therefore unknown to receiver 104. An approximate ML estimator of the integer CFO in the AWGN channel is described below and assumes that the values of all pilots and of all the data symbols have the same magnitude and that the power of $p_m[k]$ is equal to that of $D_m[k]$, which is set to one without loss of generality. A more general case is then described wherein the power of the pilot subcarriers is different from the power of the data subcarriers.

Figure 7:
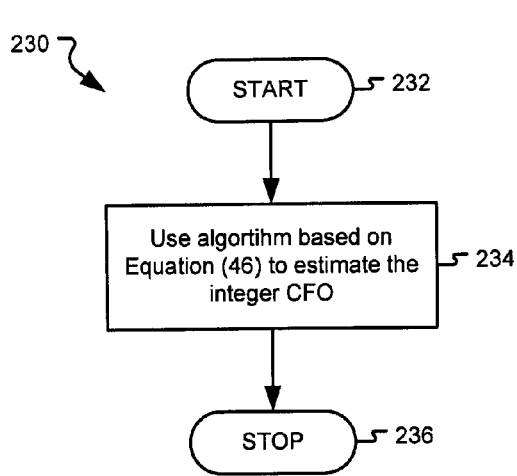
FIG. 7 is a flow chart of a method for estimating an integer CFO for an additive Gaussian white noise (AWGN) channel.

Referring now to FIG. 7, a method 230 is provided for determining the CFO estimate. The method 230 can be executed by the estimator 124. The method 230 starts in block 232. Control then proceeds to block 234 and estimates the integer CFO in accordance with Equation (46), which is derived below. The method then returns to other processes via exit block 236.

The derivation of Equation (46) will now be described. From Equation (32), for the AWGN channel, the received signal can be represented as follows:

$$Y_m[k]=e^{j(2\pi l m \alpha+\Delta\theta)}X_m[k-l]+Z_m[k]. \quad (34)$$

In addition to the integer CFO, the phase offset $\Delta\theta$ is unknown to receiver 104 and needs to be either estimated or removed. Focusing on the estimation of the integer CFO only, the phase offset $\Delta\theta$ can be removed from the received signal by multiplying $Y_m[k]$ with $Y^*_{m-1}[k]$:

$$V_m[k]=Y^*_{m-1}[k]Y_m[k]=e^{j2\pi l \alpha}X^*_{m-1}[k-l]X_m[k-l]+Z_m[k], \quad (35)$$

where the noise $Z_m[k]$ is $$Z_m[k]=e^{-j(2\pi l(m-1)\alpha+\Delta\theta)}X^*_{m-1}[k-l]Z_m[k]+e^{j(2\pi l m \alpha+\Delta\theta)}X_m[k-l]Z^*_{m-1}[k]+Z^*_{m-1}[k]Z_m[k]. \quad (36)$$

It can be assumed that the estimation of the integer CFO is based on the observation vector $V_m=[V_m[0]V_m[1] \ldots V_m[N-1]]$.

From this point onward, the OFDM symbol number m will be omitted to simplify the notation when there is no potential for confusion.

The ML estimate of the integer frequency offset l given the observation V is the integer n that maximizes the following statistic:

$$T(n)=f(V|l=n), \quad (37)$$

where $f(V|l=n)$ is the conditional probability density function (pdf) of V given $l=n$. Since the observation V depends not only on the integer frequency offset l but also on the values of the data symbol products $D_m[k]$ for $k \in S_d$, the conditional pdf $f(V|l=n)$ can be obtained by averaging the conditional pdf $f(V|D=d, l=n)$:

$$f(V|l=n)=\sum_{all\ d} f(V|D=d, l=n)P\{D=d\}, \quad (38)$$

where $D=[D[k_1]D[k_2] \ldots D[k_{N_d}]]$ for $k_i \in S_d$, and $d=[d[k_1]d[k_2] \ldots d[k_{N_d}]]$ represents the actual value assumed by the random vector D. This disclosure assumes that the data values $d[k_i]$ are independent and identically distributed. Then $P\{D=d\}$ is constant regardless of d. With this assumption, the following expression $T_2(n)$ can be used instead of $T_1(n)$ for ML estimation:

$$T_2(n)=\sum_{all\ d} f(V|D=d, l=n). \quad (39)$$

When the noise in each subcarrier is independent of the noise in other subcarriers, the conditional pdf $f(V|D=d, l=n)$ becomes $$f(V|D=d, l=n)=\prod_{k \in S_p} f_{Z'[k+n]|D,l}(V[k+n]- \quad (40)$$

$$e^{j2\pi n \alpha}p[k]|d,n)\prod_{k \in S_d} f_{Z'[k+n]|D,l}(V[k+n]-e^{j2\pi n \alpha}d[k]|d,n)$$

where $f_{Z'[k]}(.)$ is the pdf of $Z'[k]$.

For the derivation of a closed-form approximate ML estimator, it is assumed that $Z^*_{m-1}[k]Z_m[k]$ is negligible compared to the other terms in Equation (36). Hence, Equation (36) can be approximated by $$Z_m[k]=e^{-j(2\pi l(m-1)\alpha+\Delta\theta)}X^*_{m-1}[k-l]Z_m[k]+e^{j(2\pi l m \alpha+\Delta\theta)}X_m[k-l]Z^*_{m-1}[k]. \quad (41)$$

Note that, for given data symbol products d and integer CFO n, the distribution of $Z_m[k]$ does not depend on k, since the magnitude of all data symbols $X_m[k]$ is assumed to be the same. If the SNR is high enough for the approximation of Equation (36) to be accurate, $Z_m[k]$ will approximately follow a Gaussian distribution, and its variance can approximated as $\sigma_{Z'[k]|D,l}^2 \approx \sigma_{Z'}^2 \approx 2\sigma_Z^2$. The higher the SNR is, the more accurate this approximation will be. With this approximation, the pdf of $Z'[k]$ can be expressed as $$f_{Z'[k]|D,l}(x) \approx \frac{1}{\pi\sigma_{Z'}^2}e^{-\frac{|x|^2}{\sigma_{Z'}^2}} \approx \frac{1}{2\pi\sigma_Z^2}e^{-\frac{|x|^2}{2\sigma_Z^2}}. \quad (42)$$

By simple algebraic manipulation, it can be shown that $$f_{Z'[k+n]|D,l}(V[k+n]-e^{j2\pi n \alpha}p[k]|d,n) \approx \quad (43)$$

$$\frac{1}{2\pi\sigma_Z^2}e^{-\frac{|V[k+n]|^2+|p[k]|^2}{2\sigma_Z^2}}e^{\frac{\Re\{V[k+n]e^{-j2\pi n \alpha}p^*[k]\}}{\sigma_Z^2}},$$

where $\Re\{x\}$ denotes the real part of x. Similarly, for the data subcarriers, $$f_{Z'[k+n]|D,l}(V[k+n]-e^{j2\pi n\alpha}d[k]|d,n) \approx \frac{1}{2\pi\sigma_Z^2}e^{-\frac{|V[k+n]|^2+|d[k]|^2}{2\sigma_Z^2}}e^{\frac{\Re\{V[k+n]e^{-j2\pi n\alpha}d^*[k]\}}{\sigma_Z^2}}. \quad (44)$$

Substituting Equation (43) and Equation (44) into Equation (40), $$T_2(n) \approx \left(\frac{1}{2\pi\sigma_Z^2}\right)^N \quad (45)$$

$$\prod_{k \in S_d} e^{-\frac{|p[k]|^2}{2\sigma_Z^2}} \prod_{k \in S_d \cup S_p} e^{-\frac{|V[k+n]|^2}{2\sigma_Z^2}} \prod_{k \in S_p} e^{\frac{\Re\{V[k+n]e^{-j2\pi n\alpha}p^*[k]\}}{\sigma_Z^2}}$$

$$\sum_{all\ d} \left\{\prod_{k \in S_d} e^{-\frac{|d[k]|^2}{2\sigma_Z^2}} \prod_{k \in S_d} e^{\frac{\Re\{V[k+n]e^{-j2\pi n\alpha}d^*[k]\}}{\sigma_Z^2}}\right\}$$

In Equation (45), $$\prod_{k \in S_d} e^{-\frac{|p[k]|^2}{2\sigma_Z^2}} \text{ and } \prod_{k \in S_d} e^{-\frac{|d[k]|^2}{2\sigma_Z^2}}$$

are independent of n. Moreover, $$\prod_{k \in S_d \cup S_p} e^{-\frac{|V[k+n]|^2}{2\sigma_Z^2}}$$

is independent of n because it has been assumed that X[k] (and, consequently, V[k]) is periodic with period N, and that $N_p+N_d=N$. Hence, whatever the value of n is, the product will always include all the subcarriers of the OFDM symbol.

The integer CFO estimator does not need to consider the terms that are independent of n, and $T_3(n)$ can be used for ML estimation $$T_3(n) = \quad (46)$$

$$\left(\prod_{k \in S_p} e^{\frac{\Re\{V[k+n]e^{-j2\pi n\alpha}p^*[k]\}}{\sigma_Z^2}}\right) \sum_{all\ d} \left(\prod_{k \in S_d} e^{\frac{\Re\{V[k+n]e^{-j2\pi n\alpha}d^*[k]\}}{\sigma_Z^2}}\right).$$

The approximate ML estimator is derived under the assumption that the data subcarriers are modulated using quadrature phase shift keying (QPSK). This assumption leads to simple expressions for the estimator, and makes it easier to generalize the approximate ML estimator to the case where the data subcarriers are using higher order PSK. The case of QAM modulation is more complex, and will be discussed after the derivation of the QPSK approximate ML estimator below. For QPSK, each d[k] for $k \in S_d$ can only take the values $\pm 1$ and $\pm j$, since consecutive QPSK symbols can only differ by an angle that is a multiple of $\pi/2$. Assuming that the d[k]'s are independent of one another, $T_3(n)$ can be rewritten as $$T_3(n) = \left(\prod_{k \in S_p} e^{\frac{\Re\{V[k+n]e^{-j2\pi n\alpha}p^*[k]\}}{\sigma_Z^2}}\right) \quad (47)$$

$$\prod_{k \in S_d} 2\left(\cosh\left(\frac{\Re\{V[k+n]e^{-j2\pi n\alpha}\}}{\sigma_Z^2}\right) + \cosh\left(\frac{\Im\{V[k+n]e^{-j2\pi n\alpha}\}}{\sigma_Z^2}\right)\right),$$

where $\Im\{x\}$ denotes the imaginary part of x. By taking the logarithm of $T_3(n)$, removing the constant terms, and multiplying by $\sigma_Z^2$, the approximate ML pilot-aided estimator (PAE) of the integer carrier frequency offset can be expressed as $$\hat{L}_{PAE} = \arg\max_n \{T_p(n) + T_d(n)\}, \quad (48)$$

where $$T_p(n) = \Re\left\{e^{-j2\pi n\alpha} \sum_{k \in S_p} V[k+n]p*[k]\right\}, \text{ and} \quad (49)$$

$$T_d(n) = \sigma_Z^2 \sum_{k \in S_d} \log\left(2\cosh\left(\frac{\Re\{V[k+n]e^{-j2\pi n\alpha}\}}{\sigma_Z^2}\right) + \quad (50)\right.$$

$$\left. 2\cosh\left(\frac{\Im\{V[k+n]e^{-j2\pi n\alpha}\}}{\sigma_Z^2}\right)\right).$$

As mentioned above, the approximate ML estimator Equation (48) was derived assuming that the data subcarriers employ QPSK modulation. When the data subcarriers employ other modulation schemes such as higher order PSK, the product $X_m[k]X^*_{m-1}[k]=d[k]$ can take values other than $\pm 1$ and $\pm j$. Thus, the resulting expression for $T_d(n)$ can be more complex. Moreover, the accuracy of the estimates will be smaller, since the angle between the constellation points is reduced. However, the derivation of the approximate ML estimators for higher order PSK modulation schemes remains straightforward.

For QAM constellations, the derivation of the approximate ML estimator becomes more cumbersome. Recall that, from Equation (41), $$Z_m[k] = e^{-j(2\pi l(m-1)\alpha+\Delta\theta)}X^*_{m-l}[k-l]Z_m[k]+$$
$$e^{j(2\pi lm\alpha+\Delta\theta)}X_m[k-l]Z^*_{m-1}[k]. \quad (51)$$

However, for QAM constellations, the magnitude of X[k] will vary. Hence, the distribution of $Z_m[k]$, while still approximately Gaussian for sufficiently high SNR, will depend on $X_m[k-l]$, i.e., the variance of $Z_m[k]$ will depend on k, n and d. More specifically, $\sigma_{Z'[k]|D,l}^2 \approx 2|d[k-n]|^2\sigma_Z^2$. Thus, the resulting ML estimator will, in general, be significantly more complex than the case of PSK constellations, since all combinations of d should be considered for the derivation of the approximate ML estimator. Moreover, it should be kept in mind that the reliability of blind estimation may not be satisfactory for higher-order constellations because the angles between the transmitted points are small. Therefore, the practical interest of a blind estimator for QAM constellations (higher than QPSK), may be limited. US digital FM radio uses BPSK for pilots and may therefore be a suitable application.

Returning to the case of QPSK, it can be seen that the approximate ML estimator based on Equation (48) makes intuitive sense since it exploits both effects caused by the integer CFO. It uses the fact that the integer carrier frequency offset results in a phase shift over two OFDM symbols and also takes into account the cyclic shift of the subcarriers caused by the integer CFO. The cyclic shift of the subcarriers is reflected on the shift of the index of V[k] in the calculation of Equation (49) and Equation (50), whereas the phase shift over the two OFDM symbols is exploited by compensating it with $e^{-j2\pi m\alpha}$ in Equation (49) and Equation (50). Specifically, from Equation (35), it is known that V[k+l]p*[k] should have a phase of $2\pi l\alpha$ in the absence of noise. Thus, $T_p(n)$ measures the magnitude of $\Sigma_{k\in S_p}V[k+n]p^*[k]$ in the direction of $e^{j2\pi m\alpha}$. When (n−l)α is an integer, $T_p(n)$ should be equal to $N_p$ in the absence of noise. However, it will have a value less than $N_p$ when the estimate n is different from l. For data subcarriers modulated using QPSK, it is known from Equation (35) that V[k+l] should have a phase of $2\pi l\alpha + q\pi/2$, where q=0, 1, 2, or 3. Thus, each term in the summation of Equation (50) measures the magnitude of the observation V[k+n] in the direction of $\pm e^{j2\pi n\alpha}$ and $\pm e^{j(2\pi n\alpha + \pi/2)}$ and takes the average of the magnitude with a function comprised of log and cosh. When (n−l)α is an integer multiple of ¼, each term should be equal to $$\sigma_Z^2 \log\left(\cosh\left(\frac{1}{\sigma_Z^2}\right)\right)$$

in the absence of noise. It will have a smaller value otherwise. In sum, $T_p(n)$ calculates the magnitude of the received signal in the direction of $e^{j2\pi n\alpha}$ after summing all the contributions from the pilot subcarriers. On the other hand, $T_d(n)$ calculates the magnitude of the received signal in the direction of $\pm e^{j2\pi n\alpha}$ and $\pm e^{j(2\pi n\alpha + \pi/2)}$ for each data signal and takes the average of the magnitude because it is not known which of the four phase transmit symbols were transmitted.

For high SNR, the approximate ML estimator can be simplified by noting that $$\cosh(x) + \cosh(y) = \frac{1}{2}(e^x + e^{-x} + e^y + e^{-y}) \approx \frac{1}{2}e^{\max\{|x|,|y|\}} \quad (52)$$

for |x|>>|y|>>0 or |y|>>|x|>>0. With this approximation for the data subcarriers, $T_d(n)$ can be simplified to $$T_{d,simp}(n) = \sum_{k\in S_d} \max\{|\Re\{V[k+n]e^{-j2\pi n\alpha}\}|, |\Im\{V[k+n]e^{-j2\pi n\alpha}\}|\}. \quad (53)$$

This approximation becomes quite accurate when the SNR is high. The simplified $T_{d,simp}(n)$ offers additional valuable insight on how the integer carrier frequency offset estimation exploits the data subcarrier part. Choosing the maximum of the magnitudes of the real part and the imaginary part in Equation (53) can be seen as making a decision on the differentially demodulated values for each data subcarrier assuming that the integer carrier frequency offset l is equal to n. When n is equal to l, the reliability metric $T_{d,simp}(n)$ will be maximum in the absence of the noise. Comparing Equation (53) with Equation (49), it can be seen that, for the pilot subcarriers whose values are known to the receiver, the reliability can be measured directly, whereas for the data subcarriers the reliability is measured after a decision on the data subcarrier value is made.

Since $$\max\{|\Re\{x\}|, |\Im\{x\}|\} = \frac{1}{\sqrt{2}}(|\Re\{e^{-j\frac{\pi}{4}}x\}| + |\Im\{e^{-j\frac{\pi}{4}}x\}|), \quad (54)$$

the operation of choosing the maximum in the calculation of $T_{d,simp}(n)$ can be replaced by the addition:

$$T_{d,simp}(n) = \frac{1}{\sqrt{2}} \sum_{k\in S_d} (|\Re\{V[k+n]e^{-j(2\pi n\alpha + \frac{\pi}{4})}\}| + |\Im\{V[k+n]e^{-j(2\pi n\alpha + \frac{\pi}{4})}\}|). \quad (55)$$

Depending on the specific implementation, the computational complexity of Equation (55) may be smaller than that of Equation (53).

Figure 8:
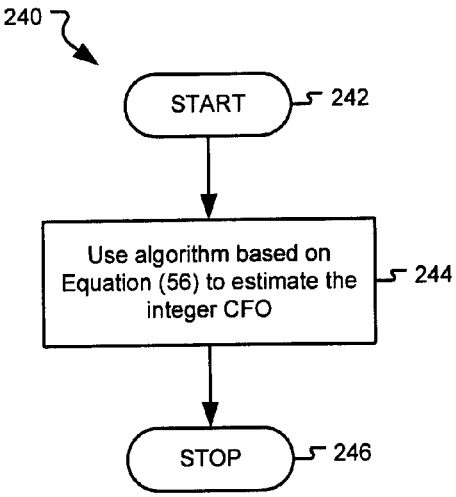
FIG. 8 is a flow chart of a method for estimating an integer CFO for an additive Gaussian white noise (AWGN) channel and a low signal to noise ratio.

Referring now to FIG. 8, a method 240 is provided for determining the CFO estimate under low signal-to-noise ratio (SNR) conditions. The method 240 can be executed by the estimator 124. The method 240 starts in block 242. Control then proceeds to block 244 and estimates the integer CFO in accordance with Equation (56), which is derived below. The method then returns to other processes via exit block 246.

The derivation of Equation (56) will now be described. For low SNR, the simplified metric $T_{d,simp}(n)$ can be quite different from $T_d(n)$. Essentially, the decision on the data subcarrier values can be unreliable for low SNR, and $T_{d,simp}(n)$ may become an inaccurate measure of the integer carrier frequency offset. One possible way to handle this case is to modify the PAE in Equation (48) for low SNR to $$\hat{L}_{PAE} = \underset{n}{\operatorname{argmax}}\{T_p(n) + w_d T_{d,simp}(n)\}, \quad (56)$$

where $w_d$ is a weighting factor smaller than or equal to 1. This weighting factor can be chosen empirically.

As a special case, in the absence of pilot subcarriers, the approximate ML blind estimator (BE) can be expressed as $$\hat{L}_{BE} = \underset{n}{\operatorname{argmax}}\{T_d(n)\}, \quad (57)$$

whereas the simplified approximate ML BE is $$\hat{L}_{BE} = \underset{n}{\operatorname{argmax}}\{T_{d,simp}(n)\}. \quad (58)$$

For brevity, the simplified approximate ML estimators using $T_{d,simp}(n)$ instead of $T_d(n)$ are referred to below as simplified estimators.

Although the approximate ML and the simplified ML algorithm were derived for the AWGN channel, OFDM systems also operate in fading environments. Therefore, the problems of CFO estimation and channel estimation are intertwined since it cannot be assumed that the channel is known when the CFO is being estimated.

Integer CFO estimation generally precedes channel estimation. The question that arises, then, is how receiver 104 should weigh the information from different tones. For AWGN channels the approximate ML and the simplified ML estimators can weigh subcarriers equally (except when the energy of some subcarriers is boosted, as will be described in the following section). The same is true for some existing estimators that are presented below.

For the case of multipath fading, and when no information on the channel is available, at the weights can be proportional to the channel gain, since this is the only indication that receiver 104 has on the quality of the signal in each subcarrier. In the derived approximate ML and the simplified estimator the channel gain is taken into account implicitly, since the received V[k] are used in the expressions.

The discussion above assumes that there are two types of subcarriers, pilot subcarriers and data subcarriers, and that the power of the pilot subcarriers is the same as that of the data subcarriers. In the discussion below, some variations of the estimators are examined under different assumptions.

In some cases, an OFDM system may be using pseudo-pilot subcarriers. For example, the U.S. HD Radio system has pseudo-pilot subcarriers or reference subcarriers that are modulated using differential binary PSK (DBPSK). The pseudo-pilot subcarriers can be pilot subcarriers whose values are modified by a value that is common to all pilot subcarriers but is unknown to receiver 104.

Figure 9:
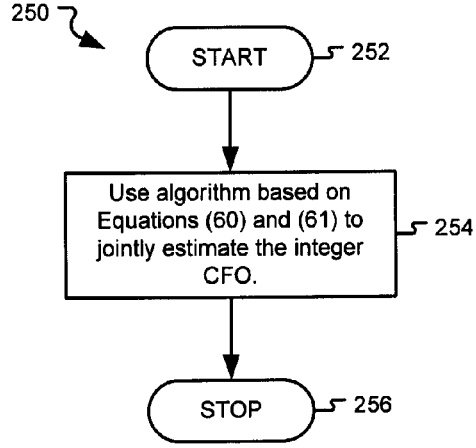
FIG. 9 is a flow chart of a method for estimating an integer CFO for a received OFDM signal that includes pseudo-pilot subcarriers.

Referring now to FIG. 9, a method 250 is provided for determining the CFO estimate when the OFDM signal includes reference carriers. The method 250 can be executed by the estimator 124. The method 250 starts in block 252. Control then proceeds to block 254 and estimates the integer CFO in accordance with at least one of Equations (60) and (61), which are derived below. The method then returns to other processes via exit block 256.

The derivation of Equations (60) and (61) will now be described. In the presence of pseudo-pilot subcarriers, the transmit symbols satisfy the following constraint:

$$X^*_{m-1}[k]X_m[k] = \begin{cases} a_m p_m[k] & \text{for } k \in S_p \\ D_m[k] & \text{for } k \in S_d, \end{cases} \quad (59)$$

where $p_m[k]$ is a sequence known to the receiver, and $D_m[k]$ and $a_m$ are random sequences unknown to the receiver.

In this case, only the term $T_p(n)$ of the approximate ML PAE and the simplified PAE is affected and should be modified. As an example, assume that $a_m$ can be equal to $\pm 1$ as in the U.S. HD Radio system. Then $T_p(n)$ in Equation (48) or Equation (57) becomes $$T_p(n) = \sigma_Z^2 \log\left(2\cosh\left(\frac{\Re\left\{e^{-j2\pi n\alpha}\sum_{k \in S_p}V[k+n]p*[k]\right\}}{\sigma_Z^2}\right)\right), \quad (60)$$

which can be approximated by $$T_{p,simp}(n) = \left|\Re\left\{e^{-j2\pi n\alpha}\sum_{k \in S_p}V[k+n]p*[k]\right\}\right|, \quad (61)$$

for high SNR. From Equation (61), it can be seen that the pseudo-pilot subcarrier values are added coherently and then the magnitude of the real part of the sum is taken since it is known that all the pseudo-pilot subcarrier values are modified by only one data value $a_m$. Since the value of $a_m$ is not known, it cannot be multiplied with $$e^{-j2\pi n\alpha}\sum_{k \in S_p}V[k+n]p^*[k]$$

to produce a positive number when n is equal to the integer CFO, as would be the case for pilot subcarriers. If the value of n is equal to the integer CFO and $a_m=1$, then $$\Re\left\{e^{-j2\pi n\alpha}\sum_{k \in S_p}V[k+n]p^*[k]\right\}$$

will be maximized, whereas when $a_m=-1$, $$-\Re\left\{e^{-j2\pi n\alpha}\sum_{k \in S_p}V[k+n]p^*[k]\right\}$$

will be maximized instead. So, as would be expected from intuition, the magnitude $$\left|\Re\left\{e^{-j2\pi n\alpha}\sum_{k \in S_p}V[k+n]p^*[k]\right\}\right|$$

is a measure of the reliability of n, whereas the transmitted data value $a_m$ is estimated from the sign of $$\Re\left\{e^{-j2\pi n\alpha}\sum_{k \in S_p}V[k+n]p^*[k]\right\}.$$

Note also the parallels with blind estimation using data subcarriers in Equation (50). The difference in the case of pseudo-pilots is that the same (unknown) constellation point is transmitted in more than one of the subcarriers. Therefore, the pseudo-pilot subcarriers should be combined before projecting and shifting, instead of projecting and shifting first and combining afterwards.

If $a_m$ can take more values, the estimator should be modified accordingly, and should project $e^{-j2\pi n\alpha}\Sigma_{k \in S_p}V[k+n]p^*[k]$ on more directions.

Figure 10:
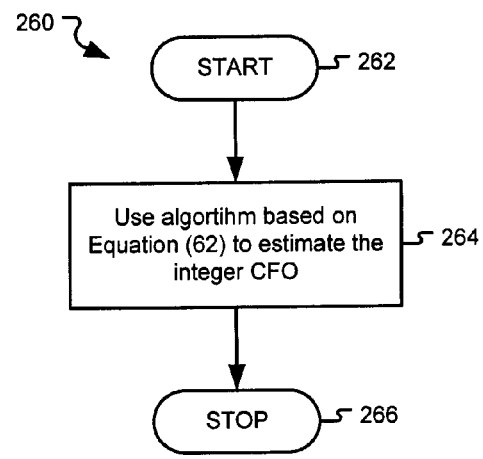
FIG. 10 is a flow chart of a method for estimating an integer CFO for a received OFDM signal that includes pseudo-pilot subcarriers.

Referring now to FIG. 10, a method 260 is provided for determining the CFO estimate when $a_m$ can take more values. The method 260 can be executed by the estimator 124. The method 260 starts in block 262. Control then proceeds to block 264 and estimates the integer CFO in accordance with one of Equation (62), which is derived below. The method then returns to other processes via exit block 266.

If $$a_m = \{-1, +1, -j, +j\}, \quad (62)$$

$$T_p(n) = \sigma_Z^2 \log\left[2\cosh\left(\frac{\Re\left\{e^{-j2\pi n\alpha}\sum_{k \in S_p} V[k+n]p^*[k]\right\}}{\sigma_Z^2}\right) + \cosh\left(\frac{\Im\left\{e^{-j2\pi n\alpha}\sum_{k \in S_p} V[k+n]p^*[k]\right\}}{\sigma_Z^2}\right)\right].$$

and $$T_{p,simp}(n) = \max\left\{\left|\Re\left\{e^{-j2\pi n\alpha}\sum_{k \in S_p} V[k+n]p^*[k]\right\}\right|, \left|\Im\left\{e^{-j2\pi n\alpha}\sum_{k \in S_p} V[k+n]p^*[k]\right\}\right|\right\}, \quad (63)$$

The transmitted data value $a_m$ is estimated by finding the larger of the two terms and by looking at the sign of $e^{-j2\pi n\alpha}\Sigma_{k \in S_p}V[k+n]p^*[k]$.

Some OFDM systems, such as digital video broadcasting (DVB), employ boosted pilot subcarriers. In such systems the power of the pilot subcarriers is larger than that of the data subcarriers in order to aid synchronization.

Figure 11:
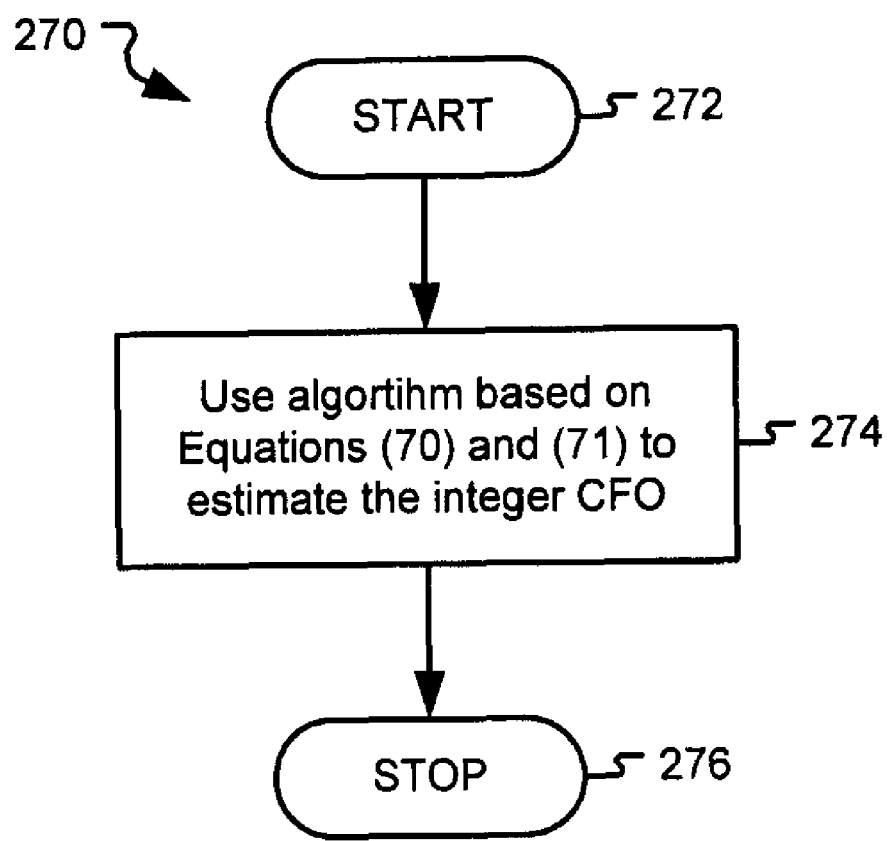
FIG. 11 is a flow chart of a method for estimating an integer CFO for a received OFDM signal that includes boosted pilot subcarriers.

Referring now to FIG. 11, a method 270 is provided for determining the CFO estimate when the OFDM signal employs boosted pilot subcarriers. The method 270 can be executed by the estimator 124. The method 270 starts in block 272. Control then proceeds to block 274 and estimates the integer CFO in accordance with Equations (70) and (71), which are derived below. The method then returns to other processes via exit block 276.

The derivation of Equations (70) and (71) will now be described. With boosted pilot subcarriers the transmit symbols satisfy the following constraint:

$$X_{m-1}^*[k]X_m[k] = \begin{cases} \beta^2 p_m[k] & \text{for } k \in S_p \\ D_m[k] & \text{for } k \in S_d \end{cases}, \quad (64)$$

where $\beta$ is a boosting factor, which is greater than or equal to 1. For DVB systems, $\beta = 4/3$ is used. Since the power of the pilot subcarriers is different from the power of the data subcarriers, the variance of $Z'[k]$ will also be dependent on the subcarrier index k. Hence, the variance of $Z'[k]$ will now be $$\sigma_{Z'[k]|D,l}^2 \approx \begin{cases} 2\beta^2 \sigma_Z^2 & \text{for } k - l \in S_p \\ 2\sigma_Z^2 & \text{for } k - l \in S_d \end{cases} \quad (65)$$

Then the conditional pdf f(V|D=d, l=n) becomes $$f(V \mid D = d, l = n) = \prod_{k \in S_p} f_{Z'[k+n]|D,l}(V[k+n] - e^{j2\pi n\alpha}\beta^2 p[k] \mid d, n) \quad (66)$$

$$\prod_{k \in S_d} f_{Z'[k+n]|D,l}(V[k+n] - e^{j2\pi n\alpha}d[k] \mid d, n),$$

where $$f_{Z'[k]|D,l}(x) \approx \begin{cases} \dfrac{1}{2\pi\beta^2\sigma_Z^2}e^{-\frac{|x|^2}{2\beta^2\sigma_Z^2}} & \text{for } k \in S_p \\ \dfrac{1}{2\pi\sigma_Z^2}e^{-\frac{|x|^2}{2\sigma_Z^2}} & \text{for } k \in S_d \end{cases}. \quad (67)$$

Therefore, similar to the approximate ML estimator of the integer CFO in the AWGN channel, $$\tilde{T}_2(n) \approx \sum_{\text{all } d} \left(\frac{1}{2\pi\sigma_Z^2}\right)^N \frac{1}{\beta^{2N_p}} \quad (68)$$

$$\left\{\prod_{k \in S_d} e^{-\frac{\beta^2|p[k]|^2}{2\sigma_Z^2}} \prod_{k \in S_d} e^{-\frac{|d[k]|^2}{2\sigma_Z^2}} \right.$$

$$\left. \prod_{k \in S_d \cup S_p} e^{-\frac{|V[k+n]|^2}{2\sigma_Z^2}} \prod_{k \in S_p} e^{\left(1-\frac{1}{\beta^2}\right)\frac{|V[k+n]|^2}{2\sigma_Z^2}} \prod_{k \in S_p} e^{\frac{\Re\{V[k+n]e^{-j2\pi n\alpha}p^*[k]\}}{\beta^2\sigma_Z^2}} \prod_{k \in S_d} e^{\frac{\Re\{V[k+n]e^{-j2\pi n\alpha}d^*[k]\}}{\sigma_Z^2}}\right\}$$

After removing all terms that are independent of n, the ML estimator can be found by maximizing $$\tilde{T}_3(n) = \left( \prod_{k \in S_p} e^{\frac{\Re \{V[k+n]e^{-j2\pi n\alpha}p^*[k]\}}{\sigma_Z^2}} e^{\left(1 - \frac{1}{\beta^2}\right)\frac{|V[k+n]|^2}{2\sigma_Z^2}} \right) \quad (69)$$

$$\left( \sum_{\text{all } d} \prod_{k \in S_d} e^{\frac{\Re \{V[k+n]e^{-j2\pi n\alpha}d^*[k]\}}{\sigma_Z^2}} \right).$$

Compared to Equation (46), it can be seen that Equation (69) has an extra term $$e^{\left(1 - \frac{1}{\beta^2}\right)\frac{|V[k+n]|^2}{2\sigma_Z^2}}$$

because of the unequal power between the pilot subcarriers and the data subcarriers. Because of the extra term, the approximate ML PAE is modified to $$\hat{L}_{PAE} = \underset{n}{\mathrm{argmax}}\{T_p(n) + T_{p,cor}(n) + T_d(n)\}, \quad (70)$$

where the energy correction factor is $$T_{p,cor}(n) = \frac{1}{2}\left(1 - \frac{1}{\beta^2}\right) \sum_{k \in S_p} |V[k+n]|^2. \quad (71)$$

The simplified approximate ML PAE can be represented in a similar way.

Some OFDM systems have virtual subcarriers besides data subcarriers and pilot subcarriers. Virtual subcarriers are modulated by zero values at the transmitter, and most often they are used as guard bands. At the receiver, the virtual subcarriers will be affected by the background noise and by possible signal leakage. Thus, for high SNR, the energy of the virtual subcarriers can be significantly smaller than the energy of the data subcarriers and the pilot subcarriers. Based on this, it is expected that the reliability of the estimation of the integer carrier frequency offset can be improved by exploiting the virtual subcarriers.

Recall that, for the derivation of the approximate ML estimator in Equation (46), it was assumed that $N_p + N_d = N$. This resulted in many of the terms in Equation (45) being independent of n, which led to a compact and intuitive expression for the ML simulator for the case of QPSK modulation. In the case of virtual subcarriers, $N_p + N_d < N$. Moreover, if k−1 is a virtual subcarrier, $Z'_m[k]$ can no longer be approximated by Equation (41), because $X_m[k-1]$ and $X_{m-1}[k-1]$ will be zero, and, therefore, $Z'_m[k] = Z^*_{m-1}[k]Z_m[k]$. Hence, the resulting expression for the approximate ML estimator will be complicated.

One way to exploit the fact that virtual subcarriers have lower energy is by not taking virtual subcarriers into account when calculating the integer CFO, the same way that boosted pilots that have more energy are given larger weights for integer CFO estimation. Hence, in this paper, the same estimators are used even in the presence of the virtual subcarriers, and $T(n)T_p(n) + T_d(n)$ is calculated using pilot and data subcarriers only.

Two known PAEs and blind estimators (BEs) are Schmidl's PAE of Equation (24) and BE of Equation (25), and Morelli's PAE and BE, respectively, which are described below. For easy comparison with the estimators developed in this disclosure, the expression of Schmidl's BE of Equation (25) was modified from the original one disclosed by Schmidl. However, it can be shown that the performance of Equation (25) is the same as that of the original BE of Schmidl.

Morelli's PAE is $$\hat{L}_{Morelli\,PAE} = \underset{n}{\mathrm{argmax}} \left\{ \sum_{k \in S_p} \Re \{V[k+n]e^{-j2\pi n\alpha}A^*[k]\} + \frac{1}{2} \sum_{k \in S_p \cup S_d} \sum_{i=m-1}^{m} |Y_i[k+n]|^2 \right\}, \quad (74)$$

and Morelli's BE is $$\hat{L}_{Morelli\,BE} = \underset{n}{\mathrm{argmax}} \left\{ \sum_{k \in S_d} \sum_{i=m-1}^{m} |Y_i[k+n]|^2 \right\}. \quad (75)$$

When pilot subcarriers are not employed, Schmidl's BE exploits the fact that the integer frequency offset introduces a phase shift over two OFDM symbols. However, it does not take the subcarrier rotation into account. On the other hand, Morelli's BE uses the facts that the integer frequency offset causes a cyclic shift of the subcarriers and that the virtual subcarriers have less energy than the pilot subcarriers and the data subcarriers. Nevertheless, the estimator does not consider the effect of the phase shift. By measuring the energy of the subcarriers, Morelli's estimator can locate the position of the used data and pilot subcarriers and thus determine the integer frequency offset. Thus, Morelli's BE works only when the system employs virtual subcarriers. On the other hand, the approximate ML BE and the simplified BE that were derived in this paper take advantage of both phenomena caused by the integer frequency offset, i.e., a phase shift over two OFDM symbols and a cyclic shift of the subcarriers.

When pilot subcarriers are used, Schmidl's PAE takes the correlation with the known pilot subcarrier values and measures the magnitude of the correlation. This is based on the fact that the integer carrier frequency offset introduces a cyclic shift of subcarriers. Since the random data subcarriers will have small correlation with high probability, the position of the pilot subcarriers can be determined by choosing the maximum of the magnitude of the correlation. The position of the pilot subcarriers indicates the integer carrier frequency offset value. On the other hand, Morelli's PAE takes the correlation with the known pilot subcarrier values multiplied by $e^{-j2\pi n\alpha}$ and measures the real part of the correlation. Essentially, Morelli's PAE relies on the fact that only the pilot subcarriers will have large magnitude of correlation with the known pilot subcarriers in the direction of the $e^{j2\pi n\alpha}$. Moreover, Morelli's PAE uses the fact that the integer frequency offset causes a cyclic shift of the subcarriers, as does Morelli's BE. For the pilot subcarriers, the approximate ML PAE and the simplified PAE in the AWGN channel, which was described above, perform the same operation as Morelli's PAE. However, for the data subcarriers, the ML estimators exploit both the phase shift property and the subcarrier rotation property unlike Morelli's PAE.

In this section, the performance of the proposed approximate ML estimator and of the simplified estimator is compared to that of Schmidl's estimators and Morelli's estimators, by Monte Carlo simulation.

The following simulation parameters are selected. The data symbol in each subcarrier is taken from a QPSK constellation. The number of data samples N and the number of cyclic prefix samples $N_g$ in one OFDM symbol are 256 and 14, respectively, resulting in cyclic prefix width ratio $$\alpha = \frac{N_g}{N} = \frac{7}{128}.$$

The integer frequency offset takes a random value within the range ±4 at each Monte Carlo run. The number of pilot subcarriers $N_p$ is fixed to 7, whereas the number of data subcarriers $N_d$ is chosen to be either 249 or 241. Thus, the number of used subcarriers $N_u = N_p + N_d$ is either 256 or 248.

Figure 12:
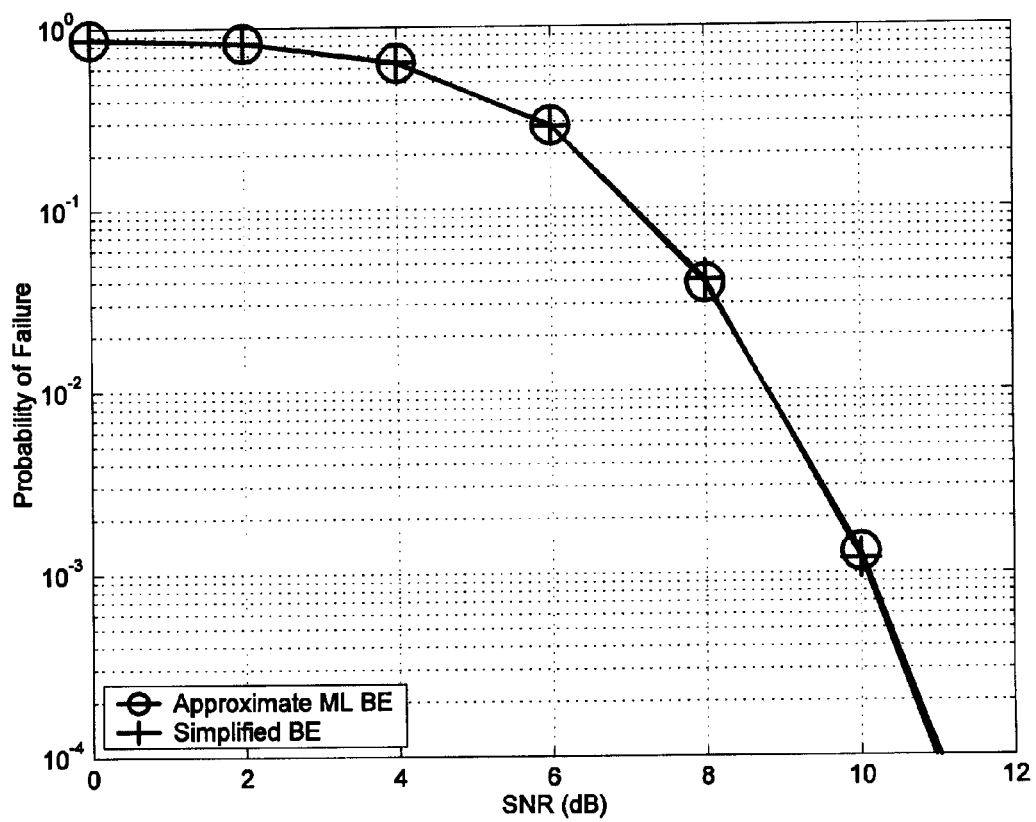
FIG. 12 is a plot of probabilities of failure for blind estimators with an AWGN channel.

Referring now to FIG. 12, a plot shows probabilities of failure of the approximate ML BE and the simplified BE for the AWGN channel and $N_u$=256. The simplified BE performs almost as well as the approximate ML BE. This shows that the simplified BE can be used instead of the approximate BE with little performance loss but with great reduction in complexity.

Figure 13:
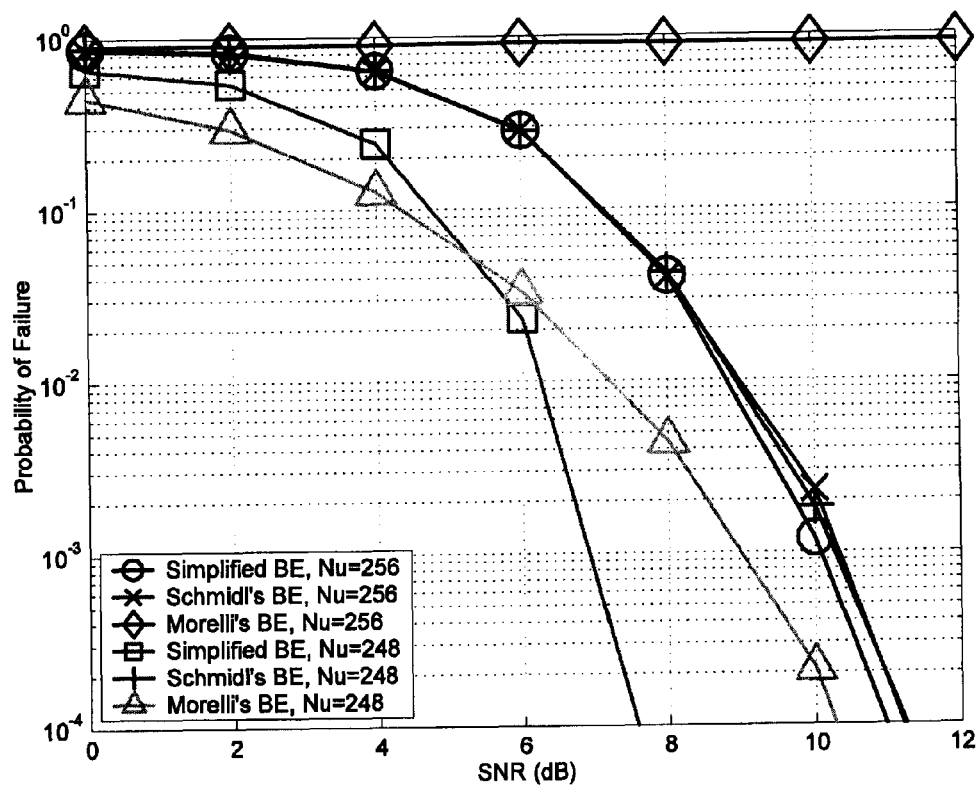
FIG. 13 is a plot of probabilities of failure for blind estimators with an AWGN channel.

Referring now to FIG. 13, a plot compares the performances of the simplified BE, Schmidl's BE, and Morelli's BE for the AWGN model of channel 106. For $N_u$=256, the simplified BE performs as well as Schmidl's BE and better than Morelli's BE. The simplified BE uses both the phase shift property and the subcarrier rotation property. On the other hand, Schmidl's BE uses only the phase shift property, whereas Morelli's BE uses the subcarrier rotation property. When all the subcarriers are used for data transmission, the simplified BE cannot detect the rotation of the subcarriers and can only detect the phase change. For this reason Schmidl's BE performs almost the same as the simplified BE. Morelli's BE cannot detect the rotation of the subcarriers, since it only measures the energy of the used subcarriers, i.e. the summation in Morelli's BE of Equation (75) is constant regardless of n. Thus, Morelli's BE cannot estimate the integer carrier frequency offset reliably. For $N_u$=248, the performance of Schmidl's BE remains almost the same as for $N_u$=256, whereas the performance of Morelli's BE improves significantly because it uses the property that an integer frequency offset causes a cyclic shift of subcarriers. As it turns out, Morelli's BE performs better than the simplified BE estimator in low SNRs. Recall that during the derivation of the approximate ML algorithm it was assumed that the SNR is high enough for the term $Z^*_{m-1}[k]Z_m[k]$ in Equation (36) to be negligible which is not true for low SNR. For high SNR Morelli's BE is outperformed by the simplified BE, which uses both the phase shift property and the subcarrier rotation property. Integer CFO estimation is usually one-shot, and, therefore, should be very reliable. Hence, in practice, the operation of the OFDM system will occur at SNRs that are sufficiently high for the simplified BE to perform well.

Figure 14:
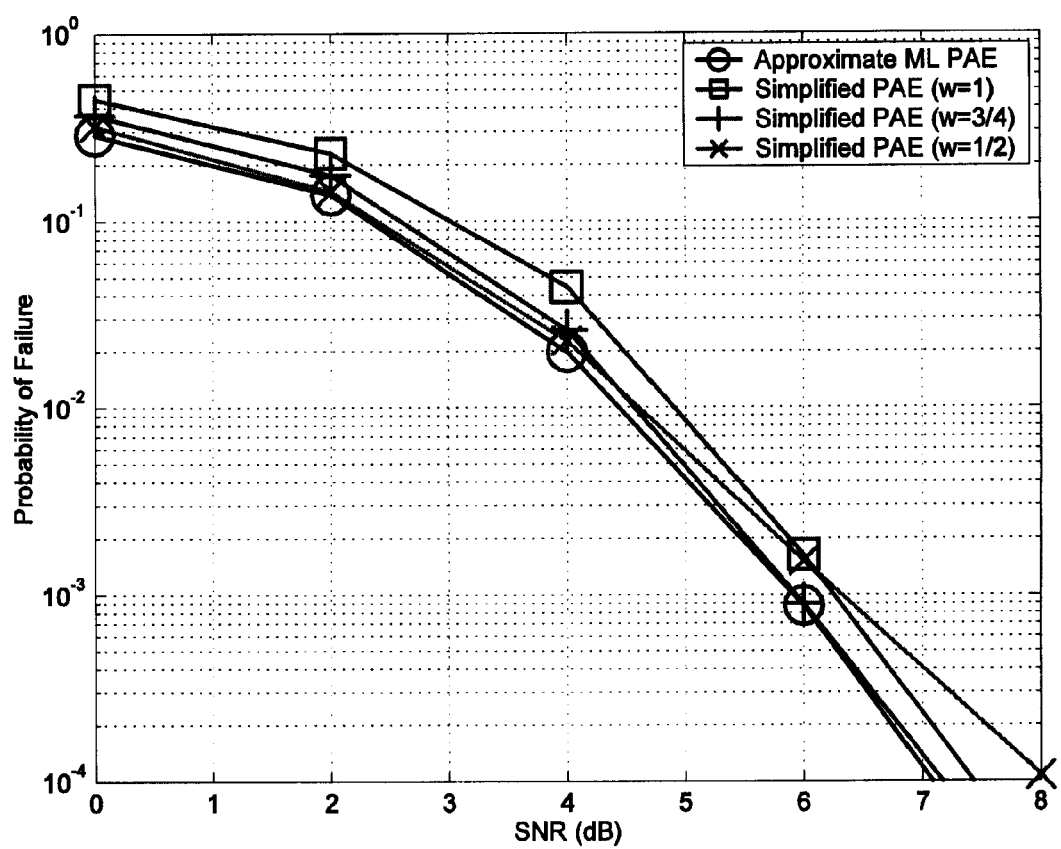
FIG. 14 is a plot of probabilities of failure for pilot-aided estimators with an AWGN channel.

Referring now to FIG. 14, a plot compares the simplified PAE and the approximate ML PAE for the AWGN channel. The simplified PAE with weight $$w = \frac{3}{4}$$

shows little performance degradation compared to the approximate ML PAE. Decreasing the weight to $$w = \frac{1}{2}$$

improves the performance of the simplified estimator for small SNR. Although it is not shown in the Figure, it is expected that the approximate ML PAE with weight w=1 outperforms the approximate MLPAE with weight $$w = \frac{3}{4}$$

for very high SNR because the approximation of $T_d(n)$ with $T_{d,simp}(n)$ becomes more accurate as the SNR increases.

Figure 15:
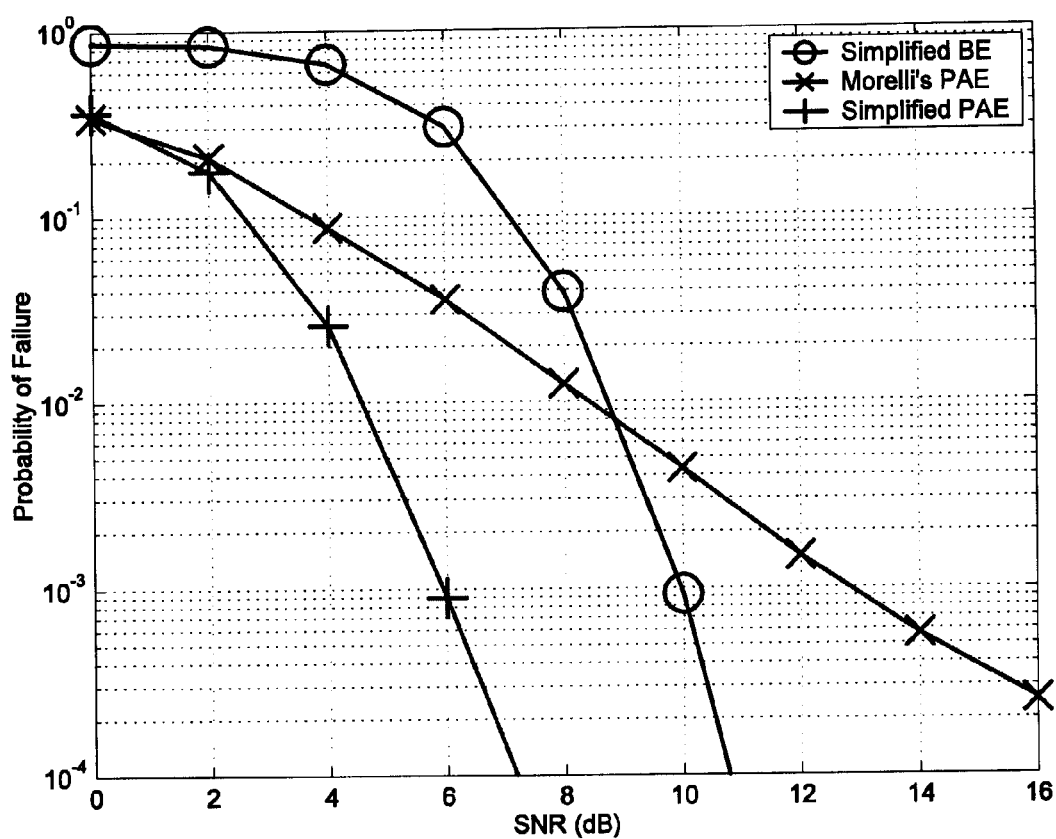
FIG. 15 is a plot of probabilities of failure for pilot-aided estimators with an AWGN channel.

Referring now to FIG. 15, a plot shows the probabilities of failure of the simplified PAE, the simplified BE, and Morelli's PAE for the AWGN channel when the system is not using any virtual subcarriers. The simplified BE ignores the existence of the pilot subcarriers, whereas Morelli's PAE exploits only the pilot subcarriers. The simplified PAE, which exploits both the pilot subcarriers and the data subcarriers constructively, outperforms the other estimators.

Figure 16:
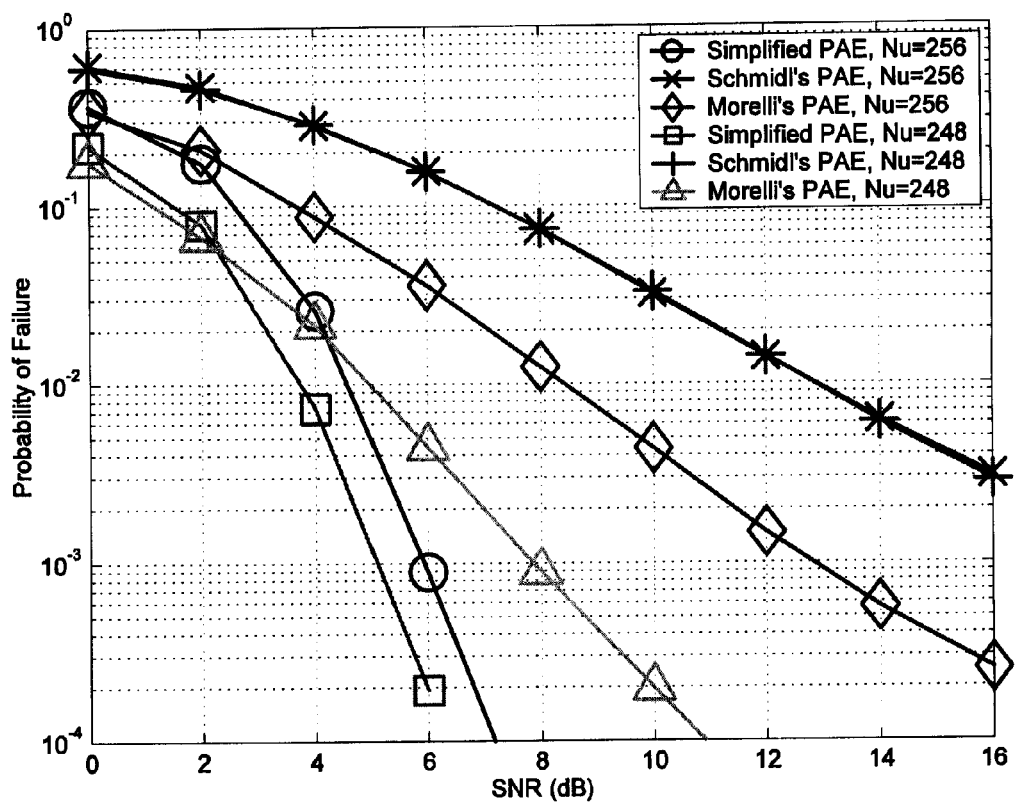
FIG. 16 is a plot of probabilities of failure for pilot-aided estimators with an AWGN channel.

Referring now to FIG. 16, a plot shows the probabilities of failure of pilot-aided estimators for the AWGN channel. The simplified PAE outperforms Morelli's PAE at high SNR, and Morelli's PAE outperforms Schmidl's PAE. It can be seen that the performance of Schmidl's PAE does not depend on the number of used subcarriers $N_u$ but only on the number of pilot subcarriers $N_p$, which remains fixed to 7. On the other hand, Morelli's PAE and the simplified PAE perform better for $N_u$=248 than for $N_u$=256 since both of them exploit the fact that the frequency offset causes a cyclic shift of subcarriers. Similar to the case of blind estimators, Morelli's PAE results in lower probability of failure in low SNRs.

Figure 17:
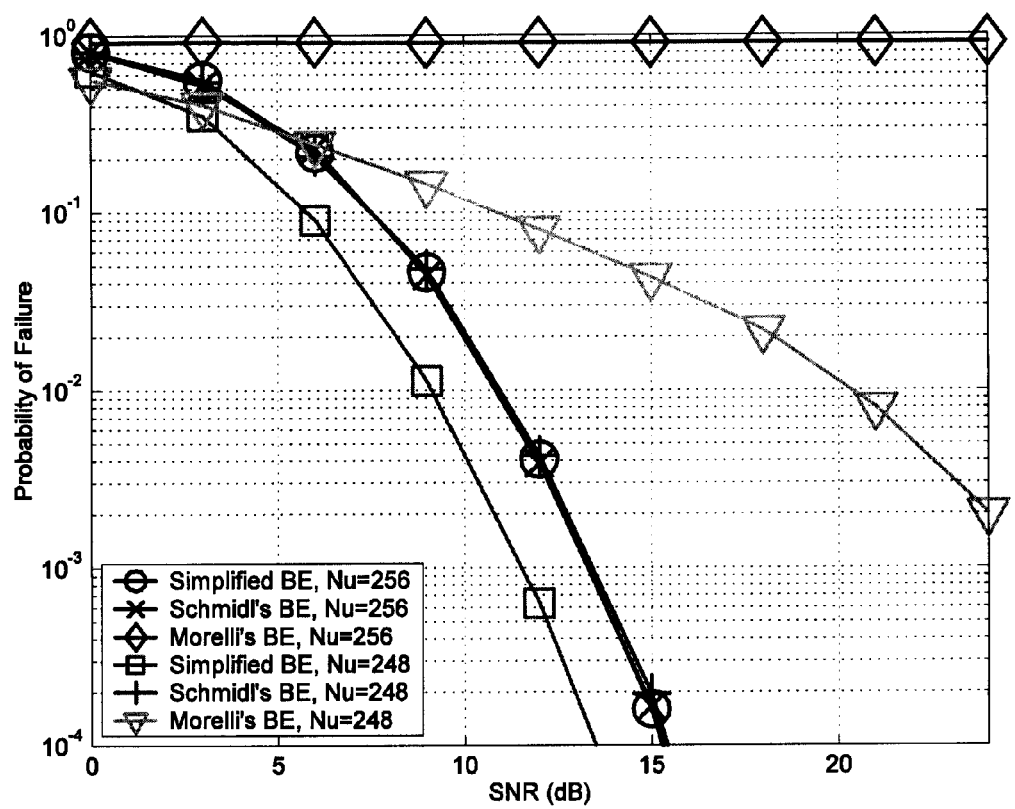
FIG. 17 is a plot of probabilities of failure for blind estimators with a multipath fading channel.
Figure 18:
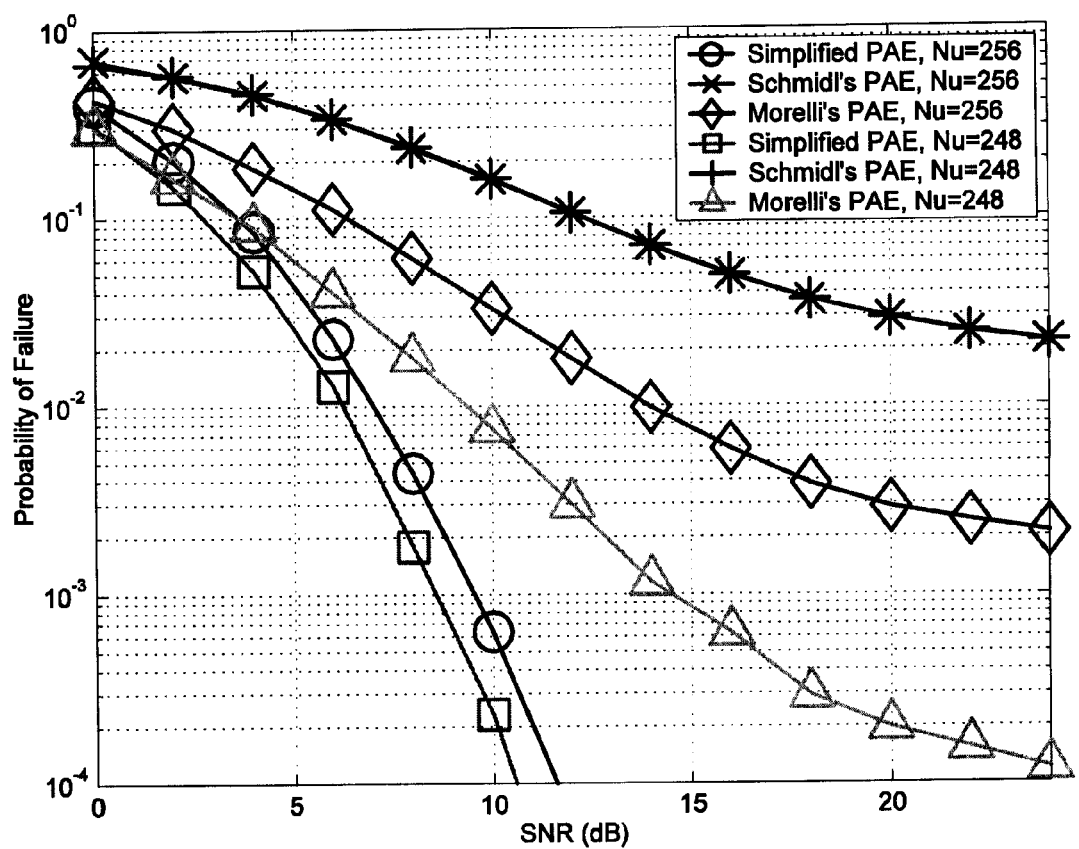
FIG. 18 is a plot of probabilities of failure for pilot-aided estimators with a multipath fading channel.

Referring now to FIGS. 17 and 18, plots show the performances of the integer CFO estimators for a multipath fading channel. The multipath channel used in the simulation is comprised of 15 paths, each of which vary independently of each other with magnitude following the Rayleigh distribution and phase following the uniform distribution. The 15 paths have an exponential power delay profile, and the root-mean-square delay spread of the multipath channel is 2 samples.

FIGS. 17 and 18 compare the probabilities of failure of the blind estimators and pilot-aided estimators, respectively. The simulation results for the multipath fading channel of this section are similar to the results for the AWGN channel in FIGS. 13 and 16 except that Morelli's BE performs worse than Schmidl's BE for $N_u$=248 and SNR larger than 6 dB. These Figures indicate that the simplified BE and PAE that were developed for the AWGN channel perform better than existing estimators even for the multipath channel, especially for high SNR where the OFDM system is likely to operate.

Figure 19:
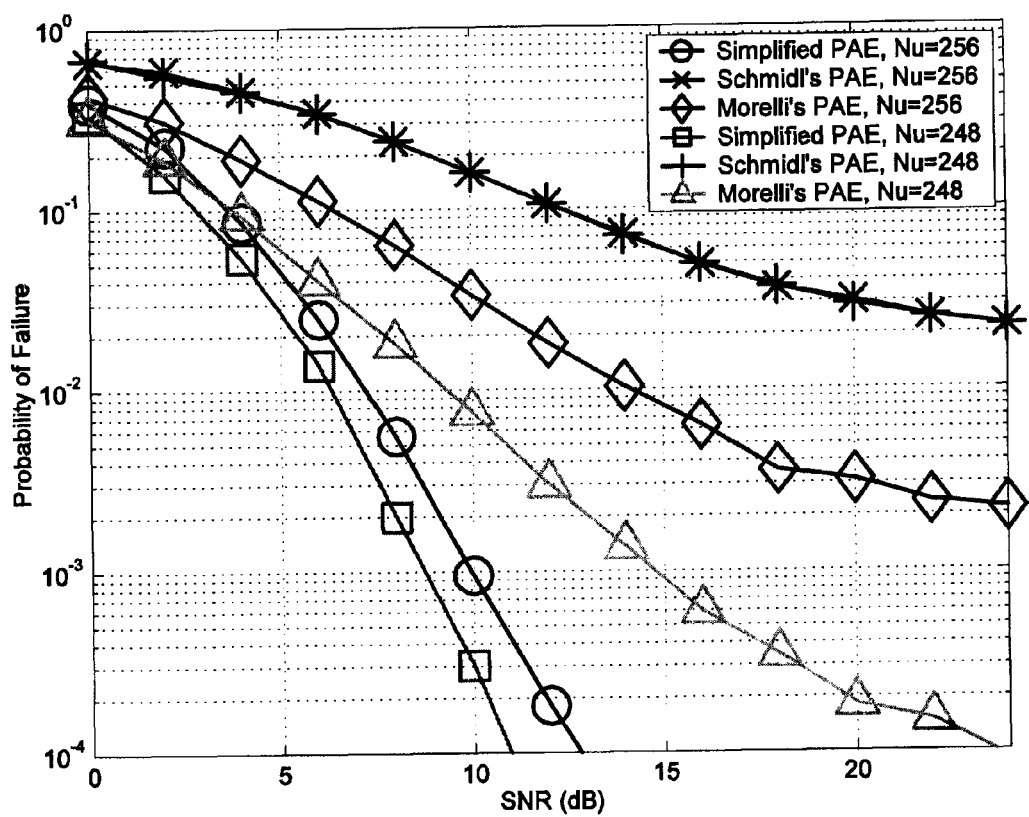
FIG. 19 is a plot of probabilities of failure for pilot-aided estimators with a multipath fading channel and residual carrier frequency offset.

Referring now to FIG. 19, a plot shows the effect of fractional CFO on the integer CFO estimation. For the derivation of the approximate ML and the simplified estimator it has been assumed that the fractional CFO is corrected before integer CFO estimation. In practice, the estimate of the fractional part of the CFO may not be exact. The residual fractional CFO will generally, affect the performance of integer CFO estimation. It is assumed that the fractional CFO is distributed uniformly in ($-0.01B_s$, $0.01B_s$), where $B_s$ is the subcarrier bandwidth, i.e., $\epsilon \sim \text{Unif}[-0.01, 0.01]$. Comparing the performance curves to those of FIG. 18, it can be seen that the simplified PAE is affected by the presence of the residual fractional CFO, but still maintains its good performance.

Figure 20:
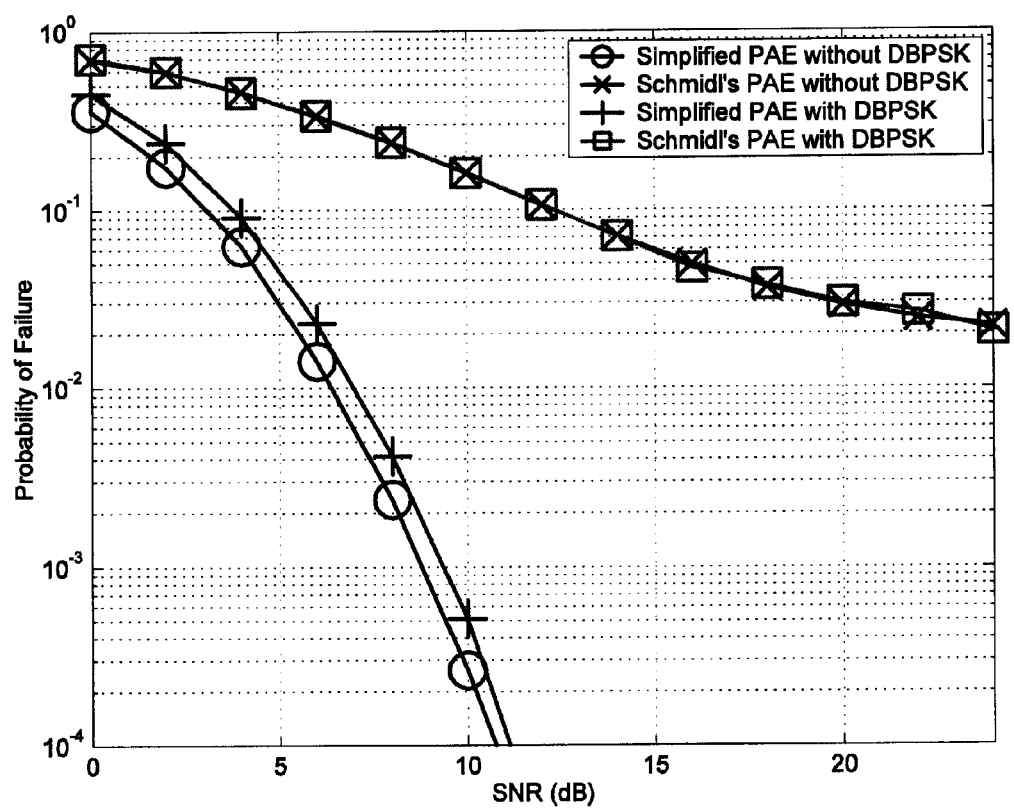
FIG. 20 is a plot of probabilities of failure for pilot-aided estimators with and without differential binary phase shift keying (DBPSK) in a multipath fading channel.

Referring now to FIG. 20, a plot shows the performance of integer CFO estimation when pseudo-pilots are used. It is assumed that the pilot subcarriers are modulated using differential BPSK in the direction of time, same as the example used above with pseudo-pilot subcarriers. Since Schmidl's PAE does not use the fact that phase information of the pilot subcarriers and is not affected by differential modulation. However, the simplified PAE is affected slightly from DBPSK compared to the case of no modulation since it attempts to exploit the phase information in pilot subcarriers optimally.

Figure 21:
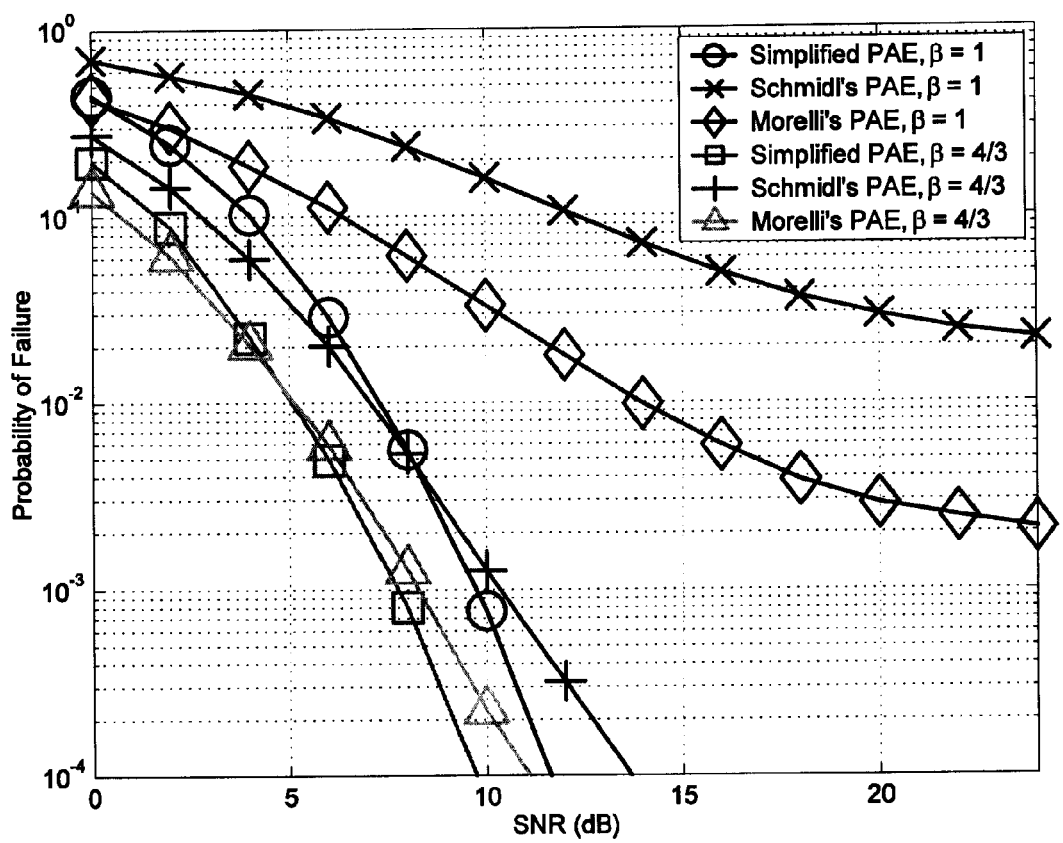
FIG. 21 is a plot of probabilities of failure for pilot-aided estimators with and without boosted pilot subcarriers in a multipath fading channel.

Referring now to FIG. 21, a plot shows the probabilities of failure of the simplified PAE, Schmidl's PAE, and Morelli's PAE with and without boosted pilot subcarriers. The performance of the PAE estimators improves when boosted pilot subcarriers are used. In particular, the performance of Schmidl's PAE and Morelli's PAE improves significantly because they use only the pilot subcarriers for the estimation of the integer carrier frequency offset. The performance improvement of the simplified PAE is less dramatic but remains the most reliable estimator for high SNR.

Figure 22A:
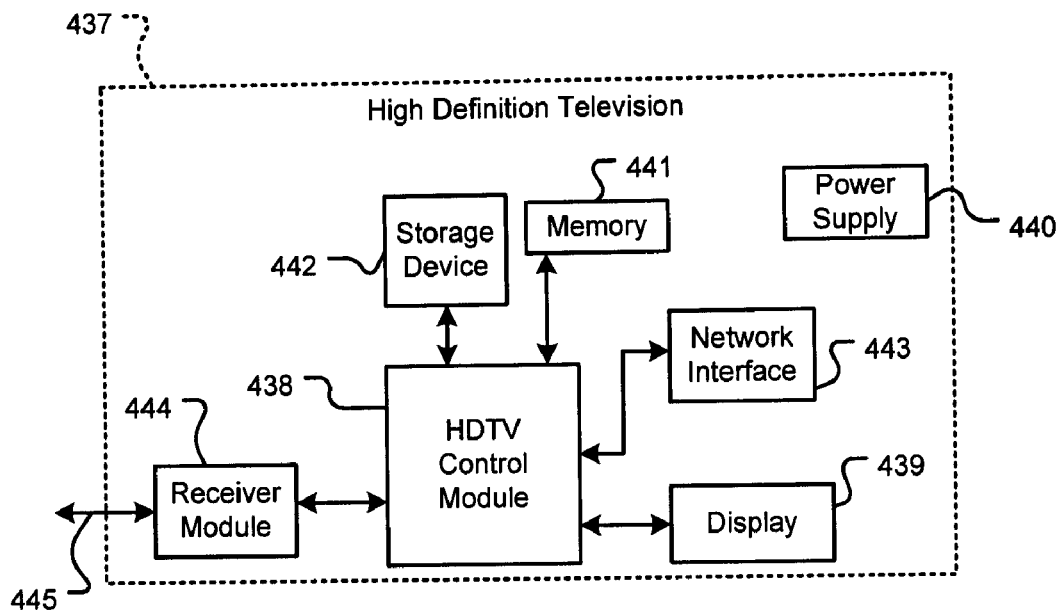
FIG. 22A is a functional block diagram of a wireless local area network (WLAN) interface in a high definition television.

Referring now to FIG. 22A, the teachings of the disclosure can be implemented in a receiver module 444 of a high definition television (HDTV) 437. The HDTV 437 includes a HDTV control module 438, a display 439, a power supply 440, memory 441, a storage device 442, a network interface 443, and an external interface 445. If the network interface 443 includes a wireless local area network interface, an antenna (not shown) may be included.

The HDTV 437 can receive input signals from the network interface 443 and/or the external interface 445, which can send and receive data via cable, broadband Internet, and/or satellite. The receiver module 444 can include an OFDM receiver that implements one of more of the integer CFO estimators that are disclosed herein. The receiver module 444 demodulates input signals that are received via the external interface 445. The HDTV control module 438 may process the input signals, including encoding, decoding, filtering, and/or formatting, and generate output signals. The output signals may be communicated to one or more of the display 439, memory 441, the storage device 442, the network interface 443, and the external interface 445.

Memory 441 may include random access memory (RAM) and/or nonvolatile memory such as flash memory, phase change memory, or multi-state memory, in which each memory cell has more than two states. The storage device 442 may include an optical storage drive, such as a DVD drive, and/or a hard disk drive (HDD). The HDTV control module 438 communicates externally via the network interface 443 and/or the external interface 445. The power supply 440 provides power to the components of the HDTV 437.

Figure 22B:
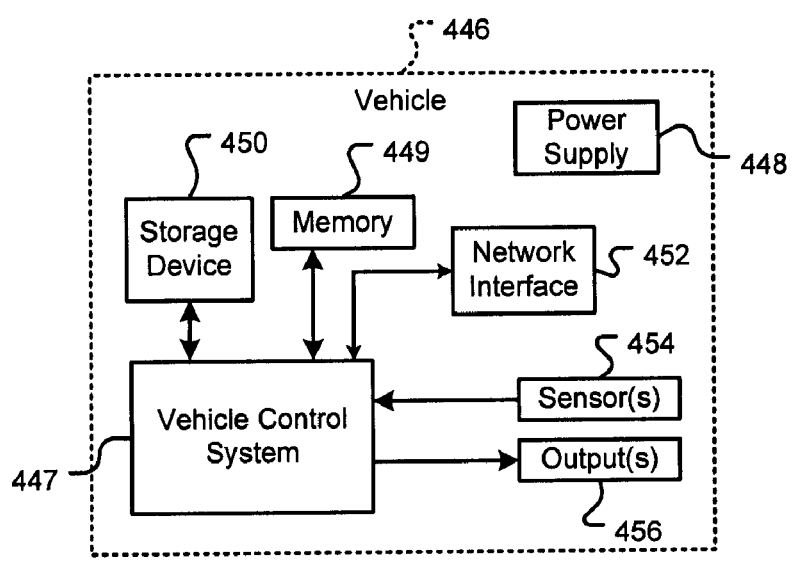
FIG. 22B is a functional block diagram of a WLAN interface in a vehicle control system.

Referring now to FIG. 22B, the teachings of the disclosure may be implemented in a network interface 452 of a vehicle 446. The vehicle 446 may include a vehicle control system 447, a power supply 448, memory 449, and a storage device 450. If the network interface 452 includes a wireless local area network interface, an antenna (not shown) may be included. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory such as flash memory, phase change memory, or multi-state memory, in which each memory cell has more than two states. The storage device 450 may include an optical storage drive, such as a DVD drive, and/or a hard disk drive (HDD). The vehicle control system 447 may communicate externally using the network interface 452.

Figure 22C:
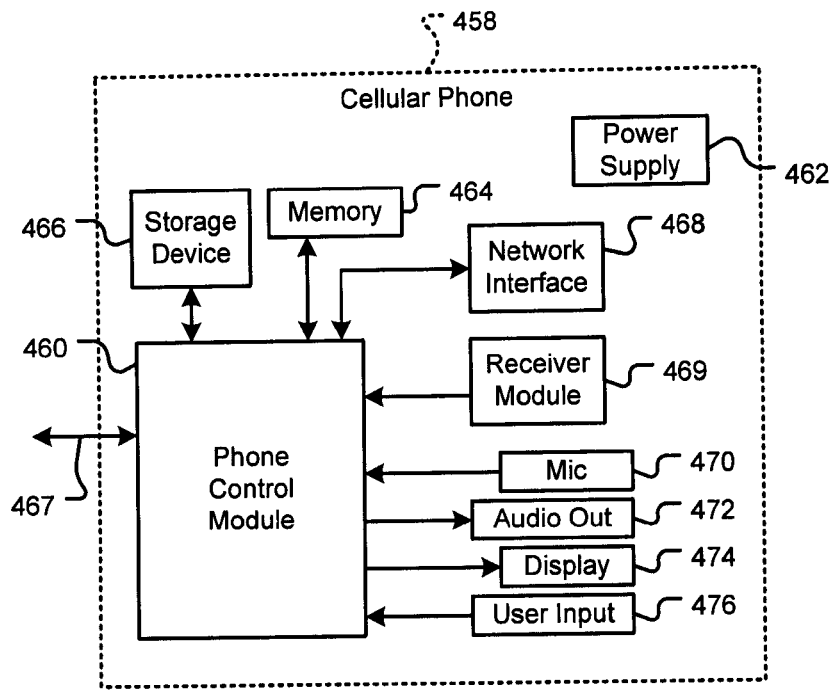
FIG. 22C is a functional block diagram of a WLAN interface in a cellular phone.

Referring now to FIG. 22C, the teachings of the disclosure can be implemented in a receiver module 469 of a cellular phone 458. The cellular phone 458 also includes a phone control module 460, a power supply 462, memory 464, a storage device 466, and a cellular network interface 467. The cellular phone 458 may include a network interface 468, a microphone 470, an audio output 472 such as a speaker and/or output jack, a display 474, and a user input device 476 such as a keypad and/or pointing device. If the network interface 468 includes a wireless local area network interface, an antenna (not shown) may be included.

The phone control module 460 may receive input signals from the cellular network interface 467, the network interface 468, the receiver module 469, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the network interface 468, and the audio output 472.

Memory 464 may include random access memory (RAM) and/or nonvolatile memory such as flash memory, phase change memory, or multi-state memory, in which each memory cell has more than two states. The storage device 466 may include an optical storage drive, such as a DVD drive, and/or a hard disk drive (HDD). The power supply 462 provides power to the components of the cellular phone 458.

Figure 22D:
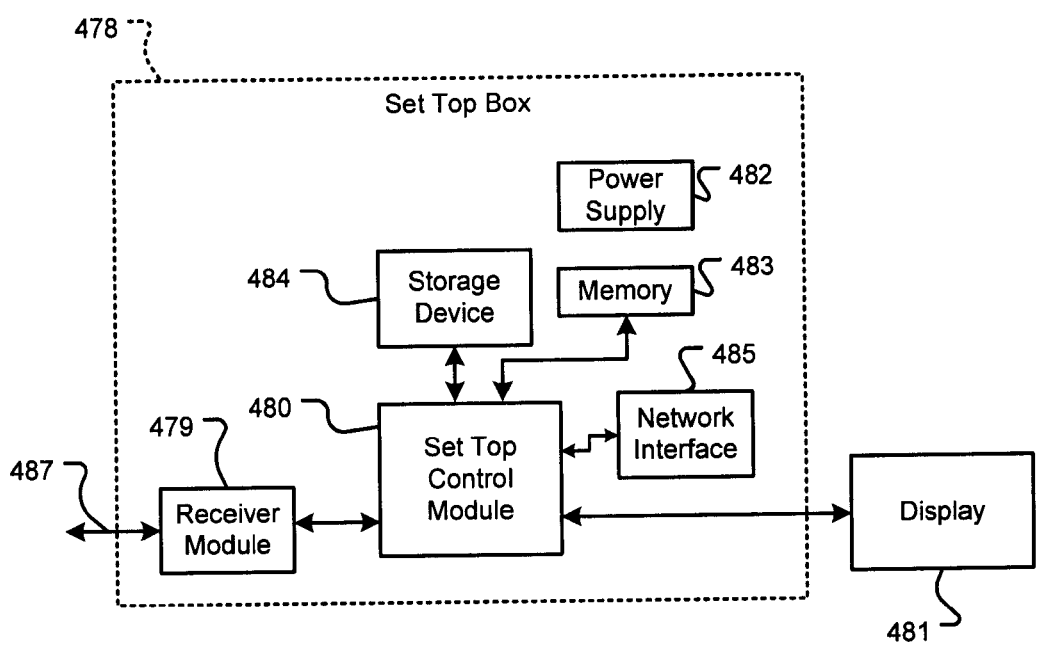
FIG. 22D is a functional block diagram of a WLAN interface in a set top box.

Referring now to FIG. 22D, the teachings of the disclosure can be implemented in a receiver module of a set top box 478. The set top box 478 also includes a set top control module 480, a display 481, a power supply 482, memory 483, a storage device 484, and a network interface 485. If the network interface 485 includes a wireless local area network interface, an antenna (not shown) may be included.

The set top control module 480 may receive input signals from the network interface 485 and an external interface 487, which can send and receive data via cable, broadband Internet, and/or satellite. The receiver module 479 can include an OFDM receiver that implements one of more of the integer CFO estimators that are disclosed herein. The receiver module 479 demodulates input signals that are received via the external interface 487. The set top control module 480 may process signals, including encoding, decoding, filtering, and/or formatting, and generate output signals. The output signals may include audio and/or video signals in standard and/or high definition formats. The output signals may be communicated to the network interface 485 and/or to the display 481. The display 481 may include a television, a projector, and/or a monitor.

The power supply 482 provides power to the components of the set top box 478. Memory 483 may include random access memory (RAM) and/or nonvolatile memory such as flash memory, phase change memory, or multi-state memory, in which each memory cell has more than two states. The storage device 484 may include an optical storage drive, such as a DVD drive, and/or a hard disk drive (HDD).

Figure 22E:
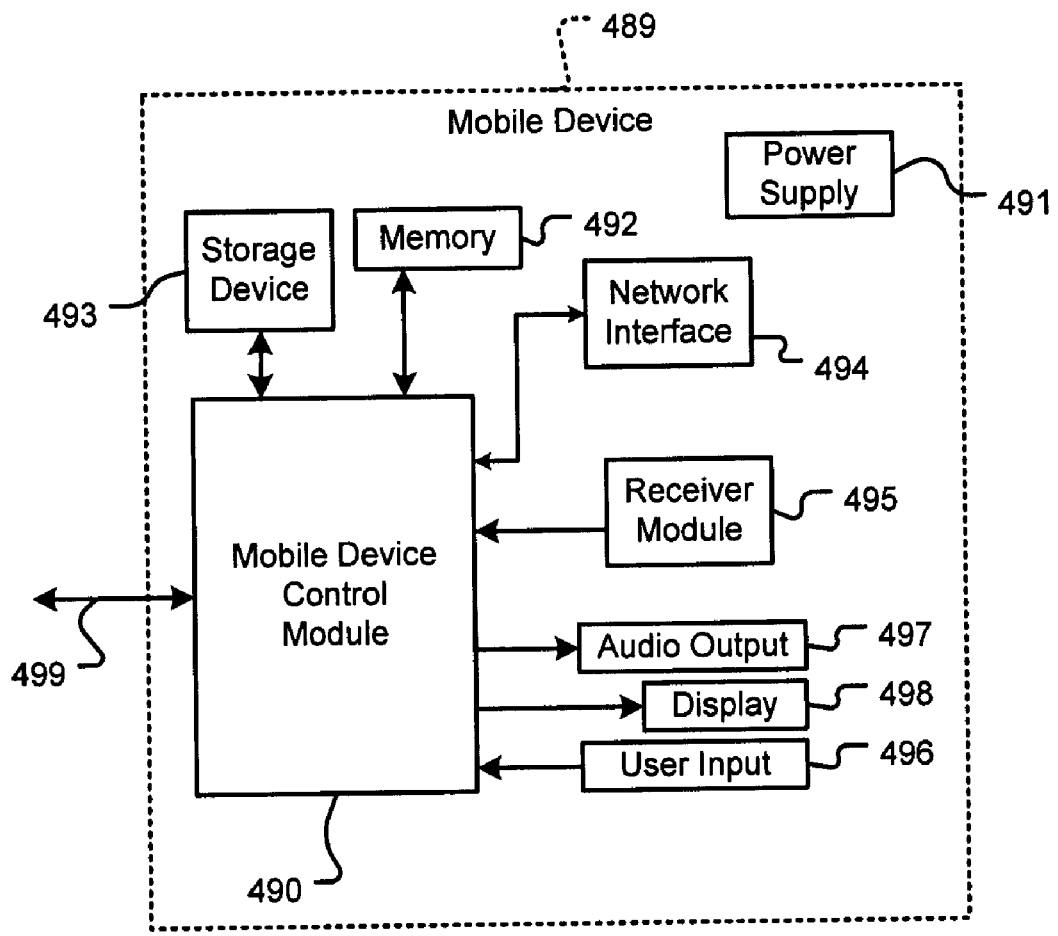
FIG. 22E is a functional block diagram of a WLAN interface in a media player.

Referring now to FIG. 22E, the teachings of the disclosure can be implemented in a receiver module 495 of a mobile device 489. The mobile device 489 may also include a mobile device control module 490, a power supply 491, memory 492, a storage device 493, a network interface 494, and an external interface 499. If the network interface 494 includes a wireless local area network interface, an antenna (not shown) may be included.

The mobile device control module 490 may receive input signals from the network interface 494, receiver module 495, and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

The invention claimed is:

1. An apparatus comprising:
an estimator including:
a receiver that receives a plurality of frequency-domain symbols, each symbol including at least one of a plurality of pilot samples and a plurality of data samples;
a framer that observes the at least one of the plurality of pilot samples and the plurality of data samples in adjacent symbols, wherein the frequency-domain symbols comprise Orthogonal Frequency Division Multiplexing (OFDM) symbols, the plurality of data samples correspond to a plurality of data subcarriers in the OFDM symbols, and the plurality of pilot samples Correspond to a plurality of pilot subcarriers in the OFDM symbols; and
a calculator that calculates an integer carrier frequency offset (CFO) estimate based on a reliability metric based on the at least one of the plurality of pilot samples and the plurality of data samples that are included in the frequency-domain symbols, wherein the integer CFO estimate is based on:

$$\hat{L}_{PAE} = \underset{n}{\mathrm{argmax}}\{T_p(n) + T_d(n)\},$$

where $$T_p(n) = \Re\left\{e^{-j2\pi n\alpha}\sum_{k \in S_p} V[k+n]p^*[k]\right\}, T_d(n) =$$

$$\sigma_Z^2 \sum_{k \in S_d} \log\left(2\cosh\left(\frac{\Re\{V[k+n]e^{-j2\pi n\alpha}\}}{\sigma_Z^2}\right) + 2\cosh\left(\frac{\Im\{V[k+n]e^{-j2\pi n\alpha}\}}{\sigma_Z^2}\right)\right),$$

$\sigma_Z^2$ is a variance, n represents a subcarrier index offset, k represents a subcarrier index, α represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, and p represents a predetermined sequence of symbols.

2. The apparatus of claim 1 wherein the OFDM symbols include virtual subcarriers.

3. The apparatus of claim 1 wherein the OFDM symbols include at least one of pilot subcarriers and data subcarriers.

4. The apparatus of claim 1 wherein $T_p(n)$ is provided by one of $$T_p(n) = \sigma_Z^2 \log\left(2\cosh\left(\frac{\Re\left\{e^{-j2\pi n\alpha}\sum_{k \in S_p} V[k+n]p^*[k]\right\}}{\sigma_Z^2}\right)\right) \text{ and } T_{p,simp}(n) =$$

$$\left|\Re\left\{e^{-j2\pi n\alpha}\sum_{k \in S_p} V[k+n]p^*[k]\right\}\right|.$$

5. The apparatus of claim 4 wherein the OFDM symbols include pseudo-pilot subcarriers.

6. The apparatus of claim 5 wherein the pseudo-pilot subcarriers are modulated by one of binary phase shift keying and differential binary phase shift keying.

7. The apparatus of claim 5 wherein the pseudo-pilot subcarriers are simultaneously modified by a common value.

8. The apparatus of claim 4 wherein $T_p(n)$ is provided by one of $$T_p(n) = \sigma_Z^2 \log\left[2\left(\cosh\left(\frac{\Re\left\{e^{-j2\pi n\alpha}\sum_{k \in S_p} V[k+n]p^*[k]\right\}}{\sigma_Z^2}\right) + \cosh\left(\frac{\Im\left\{e^{-j2\pi n\alpha}\sum_{k \in S_p} V[k+n]p^*[k]\right\}}{\sigma_Z^2}\right)\right)\right] \text{ and } T_{p,simp}(n) =$$

$$\max\left\{\left|\Re\left\{e^{-j2\pi n\alpha}\sum_{k \in S_p} V[k+n]p^*[k]\right\}\right|, \left|\Im\left\{e^{-j2\pi n\alpha}\sum_{k \in S_p} V[k+n]p^*[k]\right\}\right|\right\},$$

where $\sigma_Z^2$ is a variance, n represents a subcarrier index offset, k represents a subcarrier index, α represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, and p represents a predetermined sequence of symbols.

9. The apparatus of claim 8 wherein the OFDM symbols include pseudo-pilot subcarriers.

10. The apparatus of claim 9 wherein the pseudo-pilot subcarriers are modulated by one of quadrature phase shift keying and differential quadrature phase shift keying.

11. The apparatus of claim 9 wherein the pseudo-pilot subcarriers are simultaneously modified by a common value.

12. The apparatus of claim 1 wherein the receiver is based on at least one of Institute of Electrical and Electronics Engineers (IEEE) 802.11a of the year 1999, 802.11g of the year 2003, and 802.11n of the year 2005, European Technical Standards Institute (ETSI) DVB-H of November 2004, ETSI DVB-T of March 1997, ETSI EN 300 401 V1.3.3 of May 2001, ETSI ES 201 980 V2.1.1 of May 2001, and National Radio Standards Committee (NRSC)—5 of April 2008.

13. An apparatus comprising:
 an estimator including:
  a receiver that receives a plurality of frequency-domain symbols, each symbol including at least one of a plurality of pilot samples and a plurality of data samples;
  a framer that observes the at least one of the plurality of pilot samples and the plurality of data samples in adjacent symbols, wherein the frequency-domain symbols comprise Orthogonal Frequency Division Multiplexing (OFDM) symbols, the plurality of data samples correspond to a plurality of data subcarriers in the OFDM symbols, and the plurality of pilot samples correspond to a plurality of pilot subcarriers in the OFDM symbols; and
  a calculator that calculates an integer carrier frequency offset (CFO) estimate based on a reliability metric based on the at least one of the plurality of pilot samples and the plurality of data samples that are included in the frequency-domain symbols, wherein the integer CFO estimate is based on $$\hat{L}_{PAE} = \underset{n}{\operatorname{argmax}}\{T_p(n) + w_d T_{d,simp}(n)\},$$

where $$T_p(n) = \Re\left\{e^{-j2\pi n\alpha}\sum_{k\in S_p} V[k+n]p^*[k]\right\},$$

$T_{d,simp}(n)$ is provided by one of $$T_{d,simp}(n) = \frac{1}{\sqrt{2}}\sum_{k\in S_d}\left(\left|\Re\left\{V[k+n]e^{-j\left(2\pi n\alpha+\frac{\pi}{4}\right)}\right\}\right| + \left|\Im\left\{V[k+n]e^{-j\left(2\pi n\alpha+\frac{\pi}{4}\right)}\right\}\right|\right) \text{ and}$$

$$T_{d,simp}(n) = \sum_{k\in S_d}\max\{|\Re\{V[k+n]e^{-j2\pi n\alpha}\}|, |\Im\{V[k+n]e^{-j2\pi n\alpha}\}|\},$$

$\sigma_Z^2$ is a variance, n represents a subcarrier index offset, k represents a subcarrier index, α represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, p represents a predetermined sequence of symbols, and $w_d$ represents a weighting factor.

14. The apparatus of claim 13 wherein $T_p(n)$ is provided by one of $$T_p(n) = \sigma_Z^2 \log\left(2\cosh\left(\frac{\Re\left\{e^{-j2\pi n\alpha}\sum_{k\in S_p}V[k+n]p^*[k]\right\}}{\sigma_Z^2}\right)\right) \text{ and } T_{p,simp}(n) =$$

$$\left|\Re\left\{e^{-j2\pi n\alpha}\sum_{k\in S_p}V[k+n]p^*[k]\right\}\right|.$$

15. The apparatus of claim 14 wherein the OFDM symbols include pseudo-pilot subcarriers.

16. The apparatus of claim 15 wherein the pseudo-pilot subcarriers are modulated by one of binary phase shift keying and differential binary phase shift keying.

17. The apparatus of claim 15 wherein the pseudo-pilot subcarriers are simultaneously modified by a common value.

18. The apparatus of claim 13 wherein the integer CFO estimate is based on:

$$T_p(n) = \sigma_Z^2 \log\left[2\left(\cosh\left(\frac{\Re\left\{e^{-j2\pi n\alpha}\sum_{k\in S_p}V[k+n]p^*[k]\right\}}{\sigma_Z^2}\right) + \cosh\left(\frac{\Im\left\{e^{-j2\pi n\alpha}\sum_{k\in S_p}V[k+n]p^*[k]\right\}}{\sigma_Z^2}\right)\right)\right] \text{ and } T_{p,simp}(n) =$$

$$\max\left\{\left|\Re\left\{e^{-j2\pi n\alpha}\sum_{k\in S_p}V[k+n]p^*[k]\right\}\right|, \left|\Im\left\{e^{-j2\pi n\alpha}\sum_{k\in S_p}V[k+n]p^*[k]\right\}\right|\right\},$$

where $\sigma_Z^2$ is a variance, n represents a subcarrier index offset, k represents a subcarrier index, α represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, and p represents a predetermined sequence of symbols.

19. The apparatus of claim 18 wherein the OFDM symbols include pseudo-pilot subcarriers.

20. The apparatus of claim 19 wherein the pseudo-pilot subcarriers are modulated by one of differential quadrature phase shift keying and quadrature phase shift keying.

21. The apparatus of claim 19 wherein the pseudo-pilot subcarriers are simultaneously modified by a common value.

22. An apparatus comprising:
 an estimator including:
  a receiver that receives a plurality of frequency-domain symbols, each symbol including at least one of a plurality of pilot samples and a plurality of data samples;

a framer that observes the at least one of the plurality of pilot samples and the plurality of data samples in adjacent symbols, wherein the frequency-domain symbols comprise Orthogonal Frequency Division Multiplexing (OFDM) symbols, the plurality of data samples correspond to a plurality of data subcarriers in the OFDM symbols, and the plurality of pilot samples correspond to a plurality of pilot subcarriers in the OFDM symbols; and a calculator that calculates an integer carrier frequency offset (CFO) estimate based on a reliability metric based on the at least one of the plurality of pilot samples and the plurality of data samples that are included in the frequency-domain symbols, wherein the integer CFO estimate is based on $$\hat{L}_{PAE} = \underset{n}{\mathrm{argmax}}\{T_p(n) + T_{p,corr}(n) + w_d T_d(n)\},$$

where $$T_p(n) = \Re\left\{e^{-j2\pi n\alpha}\sum_{k \in S_p} V[k+n]p^*[K]\right\},$$

$$T_{p,0ar}(n) = \frac{1}{2}\left(1 - \frac{1}{\beta^2}\right)\sum_{k \in S_p}|V[k+n]|^2, \quad T_d(n) =$$

$$\sigma_z^2 \sum_{k \in S_d} \log\left(2\cosh\left(\frac{\Re\{V[k+n]e^{-j2\pi n\alpha}\}}{\sigma_z^2}\right) + 2\cosh\left(\frac{\Im\{V[k+n]e^{-j2\pi n\alpha}\}}{\sigma_z^2}\right)\right)$$

where $\sigma_z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, $\beta$ represents a boost of pilot subcarrier power, and p represents a predetermined sequence of symbols.

23. The apparatus of claim 22 wherein the OFDM symbols include boosted-pilot subcarriers.

24. The apparatus of claim 23 wherein the power of the boosted-pilot subcarriers is greater than the power of data subcarriers of the OFDM symbols.

25. The apparatus of claim 22 wherein $T_d(n)$ is provided by one of $$T_{d,simp}(n) =$$

$$\frac{1}{\sqrt{2}}\sum_{k \in S_d}\left(\left|\Re\{V[k+n]e^{-j(2\pi n\alpha + \frac{\pi}{4})}\}\right| + \left|\Im\{V[k+n]e^{-j(2\pi n\alpha + \frac{\pi}{4})}\}\right|\right) \text{ and}$$

$$T_{d,simp}(n) = \sum_{k \in S_d}\max\{|\Re\{V[k+n]e^{-j2\pi n\alpha}\}|, |\Im\{V[k+n]e^{-j2\pi n\alpha}\}|\}.$$

26. The apparatus of claim 25 wherein the OFDM symbols include boosted-pilot subcarriers.

27. The apparatus of claim 26 wherein the power of the boosted-pilot subcarriers is greater than the power of data subcarriers of the OFDM symbols.

28. A method of estimating an integer carrier frequency offset (CFO) in a wireless radio-frequency receiver, comprising:

receiving a plurality of frequency-domain symbols, each symbol including at least one of a plurality of pilot samples and a plurality of data samples, wherein the frequency-domain symbols comprise Orthogonal Frequency Division Multiplexing (OFDM) symbols, the plurality of data samples correspond to a plurality of data subcarriers in the OFDM symbols, and the plurality of pilot samples correspond to a plurality of pilot subcarriers in the OFDM symbols:

observing the at least one of the plurality of pilot samples and the plurality of data samples in adjacent symbols; and calculating an integer carrier frequency offset (CFO) estimate based on a reliability metric based on the at least one of the plurality of pilot samples and the plurality of data samples that are included in the frequency-domain symbols, wherein the integer CFO estimate is based on $$\hat{L}_{PAE} = \underset{n}{\mathrm{argmax}}\{T_p(n) + T_d(n)\},$$

where $$T_p(n) = \Re\left\{e^{-j2\pi n\alpha}\sum_{k \in S_p} V[k+n]p*[k]\right\}, \quad T_d(n) =$$

$$\sigma_z^2 \sum_{k \in S_\phi} \log\left(2\cos\left(\frac{\Re\{V[k+n]e^{-j2\pi n\alpha}\}}{\sigma_z^2}\right) + 2\cosh\left(\frac{\Im\{V[k+n]e^{-j2\pi n\alpha}\}}{\sigma_z^2}\right)\right),$$

$\sigma_Z^2$ is a variance, n represents a subcarrier index offset, k represents a subcarrier index, $\alpha$ represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, and p represents a predetermined sequence of symbols.

29. The method of claim 28 wherein the OFDM symbols include virtual subcarriers.

30. The method of claim 28 wherein the OFDM symbols include at least one of pilot subcarriers and data subcarriers.

31. The method of claim 28 wherein $T_p(n)$ is provided by one of $$T_p(n) = \sigma_z^2 \log\left(2\cosh\left(\frac{\Re\left\{e^{-j2\pi n\alpha}\sum_{k \in S_p} V[k+n]p*[k]\right\}}{\sigma_z^2}\right)\right) \text{ and } T_{p,simp}(n) =$$

$$\left|\Re\left\{e^{-j2\pi n\alpha}\sum_{k \in S_p} V[k+n]p*[k]\right\}\right|.$$

32. The method of claim 31 wherein the OFDM symbols include pseudo-pilot subcarriers.

33. The method of claim 32 wherein the pseudo-pilot subcarriers are modulated by one of binary phase shift keying and differential binary phase shift keying.

34. The method of claim 32 wherein the pseudo-pilot subcarriers are simultaneously modified by a common value.

35. The method of claim 31 wherein $T_p(n)$ is provided by one of $$T_p(n) = \sigma_z^2 \log \left[ 2 \left( \cosh \left( \frac{\Re \left\{ e^{-j2\pi n\alpha} \sum_{k \in S_p} V[k+n] p*[k] \right\}}{\sigma_z^2} \right) + \cosh \left( \frac{\Im \left\{ e^{-j2\pi n\alpha} \sum_{k \in S_p} V[k+n] p*[k] \right\}}{\sigma_z^2} \right) \right) \right]$$

$$\text{and } T_{p,simp}(n) = \max \left\{ \left| \Re \left\{ e^{-j2\pi n\alpha} \sum_{k \in S_p} V[k+n] p*[k] \right\} \right|, \left| \Im \left\{ e^{-j2\pi n\alpha} \sum_{k \in S_p} V[k+n] p*[k] \right\} \right| \right\}$$

where $\sigma_Z^2$ is a variance, n represents a subcarrier index offset, k represents a subcarrier index, α represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, and p represents a predetermined sequence of symbols.

36. The method of claim 35 wherein the OFDM symbols include pseudo-pilot subcarriers.

37. The method of claim 36 wherein the pseudo-pilot subcarriers are modulated by one of quadrature phase shift keying and differential quadrature phase shift keying.

38. The method of claim 36 wherein the pseudo-pilot subcarriers are simultaneously modified by a common value.

39. The method of claim 28 wherein the receiver is based on at least one of Institute of Electrical and Electronics Engineers (IEEE) 802.11a of the year 1999, 802.11g of the year 2003, and 802.11n of the year 2005, European Technical Standards Institute (ETSI) DVB-H of November 2004, ETSI DVB-T of March 1997, ETSI EN 300 401 V1.3.3 of May 2001, ETSI ES 201 980 V2.1.1 of May 2001, and National Radio Standards Committee (NRSC)—5 of April 2008.

40. A method of estimating an integer carrier frequency offset (CFO) in a wireless radio-frequency receiver, comprising:

receiving a plurality of frequency-domain symbols, each symbol including at least one of a plurality of pilot samples and a plurality of data samples, wherein the frequency-domain symbols comprise Orthogonal Frequency Division Multiplexing (OFDM) symbols, the plurality of data samples correspond to a plurality of data subcarriers in the OFDM symbols, and the plurality of pilot samples correspond to a plurality of pilot subcarriers in the OFDM symbols;

observing the at least one of the plurality of pilot samples and the plurality of data samples in adjacent symbols; and calculating an integer carrier frequency offset (CFO) estimate based on a reliability metric based on the at least one of the plurality of pilot samples and the plurality of data samples that are included in the frequency-domain symbols, wherein the integer CFO estimate is based on $$\hat{L}_{PAE} = \underset{n}{\operatorname{argmax}} \{ T_p(n) + w_d T_{d,simp}(n) \},$$

where $$T_p(n) = \Re \left\{ e^{-j2\pi n\alpha} \sum_{k \in S_p} V[k+n] p*[k] \right\},$$

$T_{d,simp}(n)$ is provided by one of $$T_{d,simp}(n) = \frac{1}{\sqrt{2}} \sum_{k \in S_d} \left( \left| \Re \left\{ V[k+n] e^{-j(2\pi n\alpha + \frac{\pi}{4})} \right\} \right| + \left| \Im \left\{ V[k+n] e^{-j(2\pi n\alpha + \frac{\pi}{4})} \right\} \right| \right) \text{ and}$$

$$T_{d,simp}(n) = \sum_{k \in S_d} \max \{ |\Re \{ V[k+n] e^{-j2\pi n\alpha} \}|, |\Im \{ V[k+n] e^{-j2\pi n\alpha} \}| \},$$

$\sigma_Z^2$ is a variance, n represents a subcarrier index offset, k represents a subcarrier index, α represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, p represents a predetermined sequence of symbols, and $w_d$ represents a weighting factor.

41. The method of claim 40 wherein $T_p(n)$ is provided by one of $$T_p(n) = \sigma_z^2 \log \left( 2 \cosh \left( \frac{\Re \left\{ e^{-j2\pi n\alpha} \sum_{k \in S_p} V[k+n] p*[k] \right\}}{\sigma_z^2} \right) \right) \text{ and } T_{p,simp}(n) = \left| \Re \left\{ e^{-j2\pi n\alpha} \sum_{k \in S_p} V[k+n] p*[k] \right\} \right|.$$

42. The method of claim 41 wherein the OFDM symbols include pseudo-pilot subcarriers.

43. The method of claim 42 wherein the pseudo-pilot subcarriers are modulated by one of binary phase shift keying and differential binary phase shift keying.

44. The method of claim 42 wherein the pseudo-pilot subcarriers are simultaneously modified by a common value.

45. The method of claim 40 wherein the integer CFO estimate is based on:

$$T_p(n) = \sigma_z^2 \log \left[ 2 \left( \cosh \left( \frac{\Re \left\{ e^{-j2\pi n\alpha} \sum_{k \in S_p} V[k+n] p*[k] \right\}}{\sigma_z^2} \right) + \cosh \left( \frac{\Im \left\{ e^{-j2\pi n\alpha} \sum_{k \in S_p} V[k+n] p*[k] \right\}}{\sigma_z^2} \right) \right) \right]$$

$$\text{and } T_{p,simp}(n) = \max \left\{ \left| \Re \left\{ e^{-j2\pi n\alpha} \sum_{k \in S_p} V[k+n] p*[k] \right\} \right|, \left| \Im \left\{ e^{-j2\pi n\alpha} \sum_{k \in S_p} V[k+n] p*[k] \right\} \right| \right\},$$

where $\sigma_Z^2$ is a variance, n represents a subcarrier index offset, k represents a subcarrier index, α represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, and p represents a predetermined sequence of symbols.

46. The method of claim 45 wherein the OFDM symbols include pseudo-pilot subcarriers.

47. The method of claim 46 wherein the pseudo-pilot subcarriers are modulated by one of differential quadrature phase shift keying and quadrature phase shift keying.

48. The method of claim 46 wherein the pseudo-pilot subcarriers are simultaneously modified by a common value.

49. A method of estimating an integer carrier frequency offset (CFO) in a wireless radio-frequency receiver, comprising:
receiving a plurality of frequency-domain symbols, each symbol including at least one of a plurality of pilot samples and a plurality of data samples, wherein the frequency-domain symbols comprise Orthogonal Frequency Division Multiplexing (OFDM) symbols, the plurality of data samples correspond to a plurality of data subcarriers in the OFDM symbols, and the plurality of pilot samples correspond to a plurality of pilot subcarriers in the OFDM symbols;
observing the at least one of the plurality of pilot samples and the plurality of data samples in adjacent symbols; and
calculating an integer carrier frequency offset (CFO) estimate based on a reliability metric based on the at least one of the plurality of pilot samples and the plurality of data samples that are included in the frequency-domain symbols, wherein the integer CFO estimate is based on $$\hat{L}_{PAE} = \underset{n}{\operatorname{argmax}}\{T_p(n) + T_{p,corr}(n) + w_d T_d(n)\},$$

where $$T_p(n) = \Re\left\{e^{-j2\pi n\alpha}\sum_{k\in S_p} V[k+n]p*[k]\right\},$$

-continued $$T_{p,oar}(n) = \frac{1}{2}\left(1 - \frac{1}{\beta^2}\right)\sum_{k\in S_p}|V[k+n]|^2,$$

$$T_d(n) = \sigma_z^2\sum_{k\in S_d}\log\left(2\cosh\left(\frac{\Re\{V[k+n]e^{-j2\pi n\alpha}\}}{\sigma_z^2}\right) + 2\cosh\left(\frac{\Im\{V[k+n]e^{-j2\pi n\alpha}\}}{\sigma_z^2}\right)\right)$$

where $\sigma_z^2$ is a variance, n represents a subcarrier index offset, k represents a subcarrier index, α represents a ratio of a number of cyclic prefix samples to a number of time domain samples, $s_p$ represents a set of indices of pilot subcarriers, $s_d$ represents a set of indices of data subcarriers, V is an observation vector, cosh is the hyperbolic cosine function, β represents a boost of pilot subcarrier power, and p represents a predetermined sequence of symbols.

50. The method of claim 49 wherein the OFDM symbols include boosted-pilot subcarriers.

51. The method of claim 50 wherein the power of the boosted-pilot subcarriers is greater than the power of data subcarriers of the OFDM symbols.

52. The method of claim 49 wherein $T_d(n)$ is provided by one of $$T_{d,simp}(n) = \frac{1}{\sqrt{2}}\sum_{k\in S_d}\left(\left|\Re\{V[k+n]e^{-j(2\pi n\alpha+\frac{\pi}{4})}\}\right| + \left|\Im\{V[k+n]e^{-j(2\pi n\alpha+\frac{\pi}{4})}\}\right|\right) \text{ and}$$

$$T_{d,simp}(n) = \sum_{k\in S_d}\max\{|\Re\{V[k+n]e^{-j2\pi n\alpha}\}|, |\Im\{V[k+n]e^{-j2\pi n\alpha}\}|\}.$$

53. The method of claim 52 wherein the OFDM symbols include boosted-pilot subcarriers.

54. The method of claim 53 wherein the power of the boosted-pilot subcarriers is greater than the power of data subcarriers of the OFDM symbols.

* * * * *